United States Patent
Lunsford et al.

(10) Patent No.: US 12,099,620 B1
(45) Date of Patent: *Sep. 24, 2024

(54) USER AUTHENTICATION

(71) Applicant: Rockloans Marketplace LLC, Detroit, MI (US)

(72) Inventors: Todd Lunsford, West Bloomfield, MI (US); Dan Smith, Detroit, MI (US); Rodney Golpe, Detroit, MI (US)

(73) Assignee: Rockloans Marketplace LLC, Detroit, MI (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/901,622

(22) Filed: Jun. 15, 2020

Related U.S. Application Data

(63) Continuation of application No. 15/888,678, filed on Feb. 5, 2018, now Pat. No. 10,685,131.

(60) Provisional application No. 62/626,262, filed on Feb. 5, 2018, provisional application No. 62/454,626, filed on Feb. 3, 2017.

(51) Int. Cl.
  *G06F 21/40* (2013.01)
  *G06F 21/62* (2013.01)
  *H04L 9/40* (2022.01)

(52) U.S. Cl.
  CPC ........ *G06F 21/6218* (2013.01); *H04L 63/083* (2013.01); *H04L 63/101* (2013.01)

(58) Field of Classification Search
  CPC .. G06F 21/6218; H04L 63/083; H04L 63/101
  USPC ......................................................... 726/28
  See application file for complete search history.

(56) References Cited

U.S. PATENT DOCUMENTS

| | | | |
|---|---|---|---|
| 6,029,154 A * | 2/2000 | Pettitt | G06Q 20/027 705/38 |
| 6,044,362 A | 3/2000 | Neely | |
| 6,067,539 A * | 5/2000 | Cohen | G06F 16/951 |

(Continued)

FOREIGN PATENT DOCUMENTS

WO WO-2016019093 A1 * 2/2016 ............. G06Q 20/40

OTHER PUBLICATIONS

Burger, Eric W., "A telecommunications web services platform for third party network access and SOA-based service delivery." In Proceedings of the 2007 Workshop on Middleware for next-generation converged networks and applications, pp. 1-6. 2007. (Year: 2007).*

(Continued)

*Primary Examiner* — Jahangir Kabir
*Assistant Examiner* — Walter J Malinowski
(74) *Attorney, Agent, or Firm* — Kilpatrick Townsend & Stockton LLP

(57) ABSTRACT

A method for authenticating a user identity linked to a user account may include receiving information that asserts a user identity including a user identifier, accessing external data stores to receive data rows that are associated with the user identity, and accessing monitoring systems to receive data vectors. The monitoring systems may monitor transmissions to receiving systems, the data vectors may include numerical target values for the receiving systems, and the data vectors may be accessed using the user identifier. The method may also include determining whether the data rows can be matched to the data vectors, and based on that determination, authenticating the user identity.

20 Claims, 15 Drawing Sheets

(56) References Cited

U.S. PATENT DOCUMENTS

| | | | | |
|---|---|---|---|---|
| 6,125,349 A * | 9/2000 | Maher | G06Q 20/00 | 705/1.1 |
| 6,453,334 B1 | 9/2002 | Vinson et al. | | |
| 6,671,666 B1 | 12/2003 | Ponting et al. | | |
| 6,901,379 B1 | 5/2005 | Balter et al. | | |
| 6,934,706 B1 | 8/2005 | Mancuso et al. | | |
| 6,968,456 B1 | 11/2005 | Tripathi et al. | | |
| 7,168,025 B1 | 1/2007 | Berkovich et al. | | |
| 7,251,624 B1 * | 7/2007 | Lee | G06Q 30/06 | 705/26.1 |
| 7,673,327 B1 | 3/2010 | Polis et al. | | |
| 7,865,937 B1 * | 1/2011 | White | H04L 63/0838 | 726/2 |
| 8,688,524 B1 | 4/2014 | Ramalingam et al. | | |
| 8,838,982 B2 * | 9/2014 | Carlson | H04L 9/3247 | 713/176 |
| 9,092,390 B1 | 7/2015 | Klau et al. | | |
| 9,148,335 B2 | 9/2015 | Tsirtsis et al. | | |
| 9,177,110 B1 | 11/2015 | Fram | | |
| 9,363,283 B1 * | 6/2016 | Herrera-Yague | G06F 21/50 | |
| 9,473,306 B2 | 10/2016 | Buldas et al. | | |
| 9,811,552 B1 | 11/2017 | Noguchi et al. | | |
| 9,858,341 B1 | 1/2018 | Frankovitz | | |
| 9,959,531 B2 | 5/2018 | Purves et al. | | |
| 10,108,791 B1 * | 10/2018 | Masterman | G06F 21/32 | |
| 10,110,601 B1 | 10/2018 | Jakobsson et al. | | |
| 10,148,533 B1 | 12/2018 | Hull et al. | | |
| 10,158,650 B1 | 12/2018 | Hadiaris et al. | | |
| 10,255,424 B1 * | 4/2019 | Lunsford | H04L 9/085 | |
| 10,354,252 B1 * | 7/2019 | Sahar | G06Q 20/3224 | |
| 10,412,191 B1 * | 9/2019 | Brandwine | G06F 9/45533 | |
| 10,621,337 B1 * | 4/2020 | Sharabani | G06F 21/121 | |
| 10,846,792 B1 * | 11/2020 | Wilkinson | G06Q 40/025 | |
| 2002/0032755 A1 | 3/2002 | Abrahams et al. | | |
| 2002/0064149 A1 * | 5/2002 | Elliott | H04L 65/1096 | 370/352 |
| 2002/0128033 A1 * | 9/2002 | Burgess | G06F 1/3209 | 455/528 |
| 2002/0133541 A1 * | 9/2002 | Sturtevant | H04L 29/06 | 709/203 |
| 2003/0014633 A1 | 1/2003 | Gruber | | |
| 2004/0013302 A1 | 1/2004 | Ma et al. | | |
| 2004/0030932 A1 | 2/2004 | Juels et al. | | |
| 2004/0143600 A1 * | 7/2004 | Musgrove | G06F 16/951 | |
| 2004/0215707 A1 | 10/2004 | Fujita et al. | | |
| 2004/0221014 A1 * | 11/2004 | Tomkow | H04L 51/08 | 709/206 |
| 2004/0236694 A1 | 11/2004 | Tattan et al. | | |
| 2005/0216421 A1 * | 9/2005 | Barry | H04M 15/00 | 705/64 |
| 2005/0222875 A1 | 10/2005 | Lordeman et al. | | |
| 2005/0234974 A1 | 10/2005 | Bailey et al. | | |
| 2005/0240432 A1 | 10/2005 | Jensen | | |
| 2006/0153092 A1 | 7/2006 | Matityahu et al. | | |
| 2006/0153122 A1 * | 7/2006 | Hinman | H04L 67/04 | 370/328 |
| 2006/0179377 A1 | 8/2006 | Dawson et al. | | |
| 2007/0075130 A1 | 4/2007 | Potrykus | | |
| 2007/0100990 A1 * | 5/2007 | Brown | G06F 9/38 | 709/224 |
| 2007/0116047 A1 * | 5/2007 | Lee | H04L 69/08 | 370/466 |
| 2007/0150365 A1 | 6/2007 | Bolivar | | |
| 2007/0174429 A1 * | 7/2007 | Mazzaferri | H04L 63/102 | 709/218 |
| 2007/0213657 A1 * | 9/2007 | Jennewine | A61B 5/4839 | 604/66 |
| 2007/0239760 A1 | 10/2007 | Simon | | |
| 2007/0250920 A1 | 10/2007 | Lindsay | | |
| 2008/0086533 A1 | 4/2008 | Neuhauser et al. | | |
| 2008/0103972 A1 | 5/2008 | Lanc | | |
| 2008/0104094 A1 * | 5/2008 | Cowham | H04L 43/04 | |
| 2008/0133277 A1 | 6/2008 | Jang et al. | | |
| 2008/0133716 A1 * | 6/2008 | Rao | H04W 4/08 | 709/220 |
| 2008/0256038 A1 | 10/2008 | Kimelman et al. | | |
| 2009/0007245 A1 | 1/2009 | Schultz | | |
| 2009/0031125 A1 | 1/2009 | Bjorn | | |
| 2009/0094033 A1 | 4/2009 | Mozer et al. | | |
| 2009/0113143 A1 | 4/2009 | Domsch et al. | | |
| 2009/0119142 A1 | 5/2009 | Yenni et al. | | |
| 2009/0150680 A1 | 6/2009 | Buchanan et al. | | |
| 2009/0187665 A1 * | 7/2009 | Ozawa | G06F 16/00 | 709/228 |
| 2009/0219131 A1 * | 9/2009 | Barnett | G16H 40/20 | 340/5.2 |
| 2009/0271829 A1 * | 10/2009 | Larsson | H04N 21/4394 | 725/82 |
| 2009/0294523 A1 * | 12/2009 | Marano | G06F 21/32 | 235/380 |
| 2010/0088234 A1 | 4/2010 | Moore et al. | | |
| 2010/0125513 A1 * | 5/2010 | Chung | G06Q 40/128 | 705/35 |
| 2010/0161493 A1 | 6/2010 | Bennau et al. | | |
| 2010/0232276 A1 | 9/2010 | Takahashi et al. | | |
| 2010/0306040 A1 | 12/2010 | Arumugam et al. | | |
| 2010/0325707 A1 * | 12/2010 | Iverson | H04L 63/083 | 726/6 |
| 2010/0333129 A1 | 12/2010 | Alhadeff et al. | | |
| 2011/0093578 A1 | 4/2011 | Leng | | |
| 2011/0184736 A1 * | 7/2011 | Slotznick | G10L 15/1815 | 704/249 |
| 2011/0231315 A1 * | 9/2011 | Bandyopadhyay | G06Q 20/10 | 705/44 |
| 2011/0231911 A1 | 9/2011 | White et al. | | |
| 2011/0238483 A1 | 9/2011 | Yoo et al. | | |
| 2011/0281554 A1 * | 11/2011 | Mann | H04L 69/03 | 455/410 |
| 2012/0054039 A1 | 3/2012 | Patwa et al. | | |
| 2012/0084131 A1 * | 4/2012 | Bergel | G06Q 20/40 | 705/14.26 |
| 2012/0109802 A1 | 5/2012 | Griffin et al. | | |
| 2012/0123854 A1 | 5/2012 | Anderson et al. | | |
| 2012/0159647 A1 | 6/2012 | Sanin et al. | | |
| 2012/0172067 A1 * | 7/2012 | Gillin | H04L 51/12 | 455/466 |
| 2012/0206293 A1 * | 8/2012 | Nguyen | G01S 13/9017 | 342/25 F |
| 2012/0284506 A1 | 11/2012 | Kravitz et al. | | |
| 2012/0313785 A1 | 12/2012 | Hanson et al. | | |
| 2013/0013489 A1 * | 1/2013 | Kremen | G06Q 40/06 | 705/38 |
| 2013/0024364 A1 | 1/2013 | Shrivastava et al. | | |
| 2013/0055367 A1 | 2/2013 | Kshirsagar et al. | | |
| 2013/0101130 A1 | 4/2013 | Bouhraoua | | |
| 2013/0124496 A1 | 5/2013 | Edgar et al. | | |
| 2013/0125211 A1 | 5/2013 | Cashman et al. | | |
| 2013/0171965 A1 | 7/2013 | Schrecker | | |
| 2013/0173633 A1 | 7/2013 | Piepgrass et al. | | |
| 2013/0226798 A1 | 8/2013 | Orttung et al. | | |
| 2013/0304648 A1 * | 11/2013 | O'Connell | G07C 9/10 | 705/44 |
| 2013/0346331 A1 | 12/2013 | Giovannetti et al. | | |
| 2014/0067145 A1 * | 3/2014 | Shu | G05B 13/02 | 700/291 |
| 2014/0089189 A1 | 3/2014 | Vasireddy et al. | | |
| 2014/0137195 A1 * | 5/2014 | Ballard | H04L 63/08 | 726/3 |
| 2014/0189829 A1 | 7/2014 | McLachlan et al. | | |
| 2014/0214582 A1 * | 7/2014 | Gobeyn | G06Q 30/0283 | 705/26.2 |
| 2014/0214654 A1 | 7/2014 | Greenbaum et al. | | |
| 2014/0230060 A1 * | 8/2014 | Higbee | H04L 63/1425 | 726/24 |
| 2014/0237570 A1 * | 8/2014 | Shishkov | G06F 21/316 | 726/7 |
| 2014/0283055 A1 | 9/2014 | Zahran | | |
| 2014/0297363 A1 * | 10/2014 | Vemana | G06Q 30/0269 | 705/7.29 |
| 2014/0310151 A1 | 10/2014 | Shishkov et al. | | |

(56) References Cited

U.S. PATENT DOCUMENTS

| | | | |
|---|---|---|---|
| 2014/0316810 A1 | 10/2014 | Oliver et al. | |
| 2014/0316972 A1* | 10/2014 | Yan | G06Q 40/04 |
| | | | 705/37 |
| 2014/0340712 A1* | 11/2014 | Hoes | G06F 3/126 |
| | | | 358/1.15 |
| 2014/0344155 A1* | 11/2014 | Liu | G06Q 20/322 |
| | | | 705/44 |
| 2014/0372319 A1 | 12/2014 | Wolovitz | |
| 2014/0379904 A1* | 12/2014 | Shimasaki | H04L 43/0805 |
| | | | 709/224 |
| 2015/0005960 A1 | 1/2015 | Endrizzi et al. | |
| 2015/0087296 A1* | 3/2015 | Kim | H04W 52/365 |
| | | | 455/422.1 |
| 2015/0109442 A1 | 4/2015 | Derenne et al. | |
| 2015/0206141 A1 | 7/2015 | Kurian | |
| 2015/0213245 A1 | 7/2015 | Tartz et al. | |
| 2015/0227761 A1 | 8/2015 | Cohen | |
| 2015/0269383 A1 | 9/2015 | Lang et al. | |
| 2015/0271330 A1 | 9/2015 | Erel et al. | |
| 2015/0281252 A1* | 10/2015 | Melcher | H04L 63/08 |
| | | | 726/4 |
| 2015/0324356 A1* | 11/2015 | Andres Gutierrez | |
| | | | H04N 21/4532 |
| | | | 707/734 |
| 2015/0324563 A1 | 11/2015 | Deutschmann et al. | |
| 2015/0347485 A1 | 12/2015 | Cai et al. | |
| 2015/0347620 A1 | 12/2015 | Cai et al. | |
| 2015/0347683 A1* | 12/2015 | Ansari | H04L 9/30 |
| | | | 726/7 |
| 2015/0356560 A1 | 12/2015 | Shastry et al. | |
| 2015/0360366 A1 | 12/2015 | Gupta et al. | |
| 2016/0005050 A1* | 1/2016 | Teman | G06Q 30/018 |
| | | | 705/317 |
| 2016/0012427 A1* | 1/2016 | Van Heerden | G06Q 20/384 |
| | | | 705/44 |
| 2016/0019547 A1* | 1/2016 | Gurnani | G06Q 20/40145 |
| | | | 705/44 |
| 2016/0063097 A1 | 3/2016 | Brown et al. | |
| 2016/0065434 A1 | 3/2016 | Janakiraman | |
| 2016/0065563 A1 | 3/2016 | Broadbent et al. | |
| 2016/0078502 A1* | 3/2016 | Sedky | G06Q 10/02 |
| | | | 705/347 |
| 2016/0119268 A1* | 4/2016 | Sharp | H04L 51/12 |
| | | | 709/206 |
| 2016/0162478 A1* | 6/2016 | Blassin | G06Q 10/06311 |
| | | | 706/12 |
| 2016/0173701 A1* | 6/2016 | Rasiwasia | H04M 15/53 |
| | | | 455/406 |
| 2016/0180279 A1 | 6/2016 | Koerner et al. | |
| 2016/0224983 A1 | 8/2016 | Cash | |
| 2016/0248590 A1* | 8/2016 | Benson | G06Q 20/382 |
| 2016/0253688 A1 | 9/2016 | Nielsen et al. | |
| 2016/0261411 A1 | 9/2016 | Yau et al. | |
| 2016/0263483 A1 | 9/2016 | Le | |
| 2016/0300216 A1 | 10/2016 | Godsey et al. | |
| 2016/0300304 A1 | 10/2016 | Feret et al. | |
| 2016/0315929 A1* | 10/2016 | Childress | G06F 21/31 |
| 2016/0337127 A1 | 11/2016 | Schultz et al. | |
| 2017/0004487 A1 | 1/2017 | Hagen et al. | |
| 2017/0024744 A1* | 1/2017 | Finch | G06Q 20/40145 |
| 2017/0026812 A1 | 1/2017 | Schilit et al. | |
| 2017/0032368 A1 | 2/2017 | Atkins et al. | |
| 2017/0063881 A1 | 3/2017 | Doganata et al. | |
| 2017/0091765 A1 | 3/2017 | Lloyd et al. | |
| 2017/0103110 A1* | 4/2017 | Winstanley | G06F 16/3338 |
| 2017/0109767 A1* | 4/2017 | Shpanya | G06Q 30/0206 |
| 2017/0111341 A1 | 4/2017 | Huh et al. | |
| 2017/0132635 A1* | 5/2017 | Caldera | G06Q 20/4016 |
| 2017/0140141 A1 | 5/2017 | Yan et al. | |
| 2017/0169207 A1 | 6/2017 | Asnis | |
| 2017/0169421 A1* | 6/2017 | Kohli | G06Q 20/3674 |
| 2017/0180346 A1* | 6/2017 | Suarez | G06F 8/71 |
| 2017/0302661 A1 | 10/2017 | Connell et al. | |
| 2017/0316450 A1* | 11/2017 | Kobylkin | G06Q 10/067 |
| 2017/0325721 A1* | 11/2017 | Matsuda | A61B 5/117 |
| 2017/0344656 A1 | 11/2017 | Koren et al. | |
| 2017/0346830 A1 | 11/2017 | Goldfarb et al. | |
| 2017/0351989 A1 | 12/2017 | Langdon et al. | |
| 2018/0018585 A1* | 1/2018 | Marin | G06N 20/20 |
| 2018/0025080 A1* | 1/2018 | Jonas | G06F 16/2468 |
| | | | 707/769 |
| 2018/0060341 A1 | 3/2018 | Wu et al. | |
| 2018/0068160 A1 | 3/2018 | Wu | |
| 2018/0089304 A1* | 3/2018 | Vizer | G06F 16/287 |
| 2018/0113681 A1 | 4/2018 | Zhu et al. | |
| 2018/0139057 A1 | 5/2018 | Truu et al. | |
| 2018/0143975 A1* | 5/2018 | Casal | G06F 40/58 |
| 2018/0152536 A1 | 5/2018 | Abrams et al. | |
| 2018/0168903 A1* | 6/2018 | Underwood | A61G 11/007 |
| 2018/0218370 A1 | 8/2018 | Denton | |
| 2018/0219846 A1* | 8/2018 | Poschel | H04L 63/0807 |
| 2018/0302390 A1 | 10/2018 | Beecham | |
| 2019/0175101 A1* | 6/2019 | Hwang | A61B 5/7275 |
| 2019/0220583 A1 | 7/2019 | Douglas et al. | |
| 2019/0369610 A1* | 12/2019 | Chakravarthy | G05B 23/0235 |

OTHER PUBLICATIONS

Schaffer, J. S., M. L. Stokes, and N. Yan. "Enabling an integrated identity from disparate sources." IBM Journal of Research and Development 56, No. 6 (2012): 6-1. (Year: 2012).*

Dhamdhere, Dhananjay M., and K. V. Sankaranarayanan. "Dynamic currency determination in optimized programs." ACM Transactions on Programming Languages and Systems (TOPLAS) 20, No. 6 (1998): 1111-1130. (Year: 1998).*

Carreira-Perpinan, Miguel A. "One-to-many mappings, continuity constraints and latent variable models." (1999): 14-14. (Year: 1999).*

Wang, Cong, Qian Wang, Kui Ren, and Wenjing Lou. "Ensuring data storage security in cloud computing." In 2009 17th International Workshop on Quality of Service, pp. 1-9. Ieee, 2009. (Year: 2009).*

Li, Tieyan, and Yongdong Wu. "Resilient Aggregation Scheme for Confidential Sensor Reports." In 2007 IEEE International Conference on Communications, pp. 1472-1477. IEEE, 2007. (Year: 2007).

Kumar "Integrating Geographic Information Systems, Spatial Digital Libraries and Information Spaces . . . " In Proceedings of the 7$^{th}$ ACM International Symposium on Advances in Geographic Information Systems, pp. 146-151. 1999. (Year: 1999).

"Rethinking Transaction Matching Reconciliation", Adra Match, Sep. 23, 2014, 28 pages. (Year: 2014).

Kessler, Kevin, Don Biasotti, and Don Gosselin. "Oracle Fusion Middleware Administrator's Guide for Oracle Directory Integration Platform, 11 g Release 1 (11.1. 1) E 10031-06," Jan. 24, 2014. (Year: 2014).

Pascal.mail, "Connect to Local Host Bound Port From Outside", Feb. 1, 2007, lists.netfilter.org/pipermail/netfilter/2007-February. txt, 200 pages. (Year: 2007).

Wuyts, Kim, Riccardo Scandariato, Geert Claeys, and Wouter Joosen. "Hardening XDS-Based Architectures." In Availability, Reliability and Security, 2008. ARES 08. Third International Conference on, pp. 18-25. IEEE, 2008. (Year: 2008).

Shraer, Alexander, Alexandre Aybes, Bryan Davis, Christos Chrysafis, Dave Browning, Eric Krugler, Eric Stone et al. "Cloudkit: Structured Storage for Mobile Applications." Proceedings of the VLDB Endowment 11, No. 5 (2018): 540-552. (Year: 2018).

Glazer, Peter, and Jonathan Straus. "Bargaining for Your Privacy in the Information age: Systematic Factors Undermining the Equity of User-Company Online Information Transactions." In Management of Engineering & Technology (PICMET), 2014 Portland International Conference on, pp. 632-645. IEEE, 2014. (Year: 2014).

Ahuja, Mona, Cheng Che Chen, Ravi Gottapu, Jorg Hallmann, Waqar Hasan, Richard Johnson, Maciek Kozyrczak et al. "Peta-Scale Data Warehousing at Yahoo !." In Proceedings of the 2009 ACM SIGMOD International Conference on Management of Data, pp. 855-862. ACM, 2009. (Year: 2009).

(56) References Cited

OTHER PUBLICATIONS

Yang, Yingyuan, Jinyuan Sun, and Linke Guo. "Persona IA: A Lightweight Implicit Authentication System Based on Customized User Behavior Selection." IEEE Transactions on Dependable and Secure Computing (2016). (Year: 2016).

* cited by examiner

Confidence Score Calculation

1200

1202 — Initialize confidence score using fuzzy match algorithm score
- 25% - 100% match: 5 pts
- 1%-25% match: 1 pts
- 0% match: -1 pts 1204 — If data row description includes a blacklist expression, reset score to 0

1206 — Adjust confidence score based on value field thresholds
- 201+ : 5 pts
- 101 - 200 : 1 pts
- 51 - 100 : 0 pts
- 21 - 50 : -1 pts
- 0 - 20 : -100 pts 1208 — Adjust confidence score based on exact value field amount
- 25 : -1 pts
- 50 : -1 pts
- 100 : -1 pts
- 200 : -1 pts
- Other mult of 100 : -5 pts

FIG. 12

USER AUTHENTICATION

CROSS-REFERENCES TO RELATED APPLICATIONS

This application is a continuation of U.S. Non-Provisional application Ser. No. 15/888,678 filed on Feb. 5, 2018, which is incorporated herein by reference. U.S. Non-Provisional application Ser. No. 15/888,678 claims the benefit of U.S. Provisional Application No. 62/454,626 filed on Feb. 3, 2017, which is incorporated herein by reference. This application also claims the benefit of U.S. Provisional Application No. 62/626,262 filed Feb. 5, 2018, which is incorporated herein by reference.

TECHNICAL FIELD

This application discloses technology related to the fields of user authentication in digital communications. Specifically, this application discloses technology solutions for authenticating user identities by using data rows and target values from trusted third-party systems.

BACKGROUND

Authentication is the act of confirming the truth of an attribute of a single piece of data claimed to be true by an entity. User authentication is the act of confirming the truth of a user identity asserted in a computer transmission. In contrast to user identification, which refers to the act of stating or otherwise indicating a claim attesting to a user's identity, authentication is the process of actually confirming that asserted identity. The process may involve confirming the identity of a person by validating their identity documents, verifying the authenticity of a website with a digital certificate, determining the age of an artifact by carbon dating, or ensuring that a product is what its packaging and labeling claim to be. In other words, authentication often involves verifying the validity of at least one form of identification.

The authentication of user identities can pose special problems with electronic communications, such as vulnerability to man-in-the-middle attacks, where a third party taps into a communication session, and poses as one or more of the communicating parties to intercept information. Therefore, user authentication may include the verification of an active human-to-machine transfer of credentials required for confirmation of a user's identity. The term "digital authentication" refers to a group of processes where confidence for user identities is established using electronic methods and systems. The digital authentication process creates technical challenges because of the need to authenticate individuals or entities remotely over a network with limited subset of information.

User authentication may authorize human-to-machine interactions on both wired and wireless networks to enable access to network-connected systems and resources. Traditionally, user authentication has typically consisted of a simple identifier (ID) and password combination. More secure systems may include additional authentication factors to improve the security of communications. In general terms, the main authentication factors include knowledge, possession and inherence. Knowledge factors include all things a user must know in order to access a resource, including user names or IDs, passwords or personal identification numbers (PINs), and secret questions. Possession factors include anything a user must have in their possession in order to log in, including one-time password tokens, key fobs, smartphone apps, employee ID cards, subscriber identity module (SIM) card-based mobile phones, and so forth. Inherence factors include any inherent traits the user has that may be confirmed by a computer system, including retina scans, iris scans, fingerprint scans, finger vein scans, facial recognition, voice recognition, hand geometry, earlobe geometry, and so forth.

SUMMARY

In some embodiments, a system for authenticating a user identity asserted from a client device may include a front-end website that receives information from the client device that asserts a user identity, where the information may include a user identifier. The system may also include a network interface that accesses one or more external data stores to receive a plurality of data rows from the one or more external data stores, where the plurality of data rows may be associated with the user identity. The network interface may also access one or more monitoring systems to receive a plurality of data vectors from the one or more monitoring systems. The one or more monitoring systems may monitor transmissions to one or more receiving system. The plurality of data vectors may include numerical target values for the monitored one or more receiving systems. The plurality of data vectors may be accessed using the user identifier. The system may also include one or more processors and one or more memory devices including instructions that, when executed by the one or more processors, cause the one or more processors to perform operations including determining whether one or more of the one or more data rows can be matched to the one or more data vectors; and based on a determination that one or more of the one or more data rows can be matched to the one or more data vectors, authenticating the user identity.

In some embodiments, a method for authenticating a user identity asserted from a client device may include receiving information through a front-end website from the client device that asserts a user identity, where the information may include a user identifier. The method may also include accessing, through a network interface, one or more external data stores to receive a plurality of data rows from the one or more external data stores, where the plurality of data rows may be associated with the user identity. The method may additionally include accessing, through the network interface, one or more monitoring systems to receive a plurality of data vectors from the one or more monitoring systems. The one or more monitoring systems may monitor transmissions to one or more receiving system. The plurality of data vectors may include numerical target values for the monitored one or more receiving systems. The plurality of data vectors may be accessed using the user identifier. The method may further include determining, by one or more processors, whether one or more of the one or more data rows can be matched to the one or more data vectors; and based on a determination that one or more of the one or more data rows can be matched to the one or more data vectors, authenticating, by the one or more processors, the user identity.

In any embodiments, any of the following features may be included in any combination and without limitation. The method/operations may also include adding or removing a task from a task list based on the determination that one or more of the one or more data rows can be matched to the one or more data vectors. The one or more external data stores may be accessed using a set of user credentials that are not accessible by the website. The one or more external data stores may receive the plurality of data rows from one or more aggregator computer systems. The front end website may provide a portal for the client device to the one or more external data stores to log into the one or more aggregator computer systems to release the plurality of data rows. The method/operations may additionally include filtering data rows from the plurality of data rows where a value field does not exceed a threshold amount. The method/operations may further include removing non-alphanumeric tokens from a text field of the plurality of data rows, and removing a blacklist set of known tokens from the text field of the plurality of data rows. The method/operations may also include matching data rows using a fuzzy match algorithm with a result above a threshold amount. The method/operations may additionally include calculating a confidence score for the one or more of the one or more data rows that can be matched to the one or more data vectors. The method/operations may further include determining a type for each of the plurality of data vectors, wherein the type determines a matching algorithm used to determine matches between the plurality of data rows and the plurality of data vectors.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 12 illustrates a flowchart of a process for calculating a confidence score for Type III matches, according to some embodiments.

DETAILED DESCRIPTION

Figure 1A:
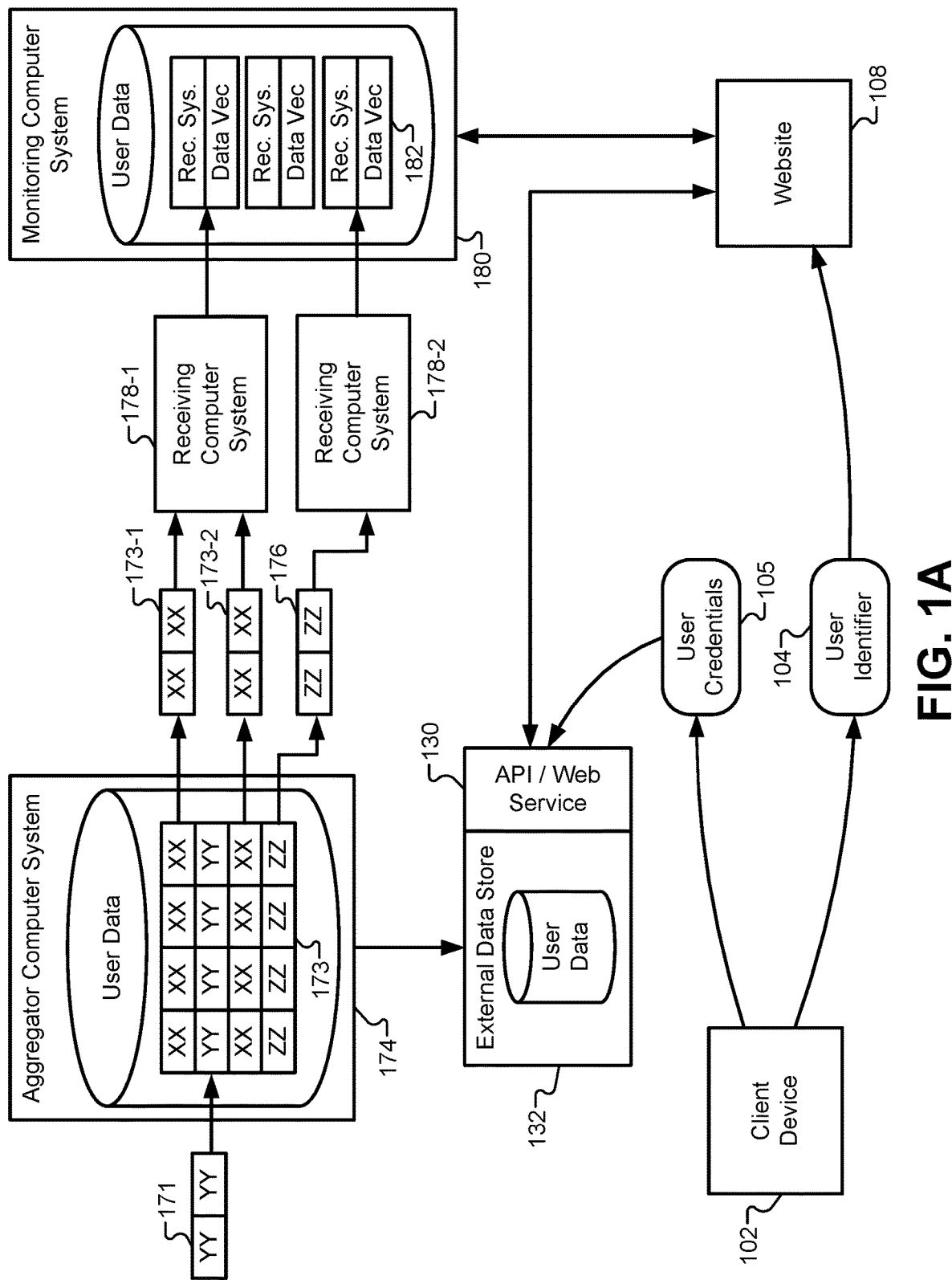
FIG. 1A illustrates a simplified block diagram of the different external systems and trusted third-party computer systems that may be involved in authenticating a user identity, according to some embodiments.

Described herein, are embodiments for authenticating a user identity. Internet-based interactions between client devices and server-driven websites often utilize some level of trust between the user of the client device and the website. One type of trust that can be established is the authentication of an asserted user identity. A user identity may be asserted by the user through a number of different processes. For example, a user can provide a username and/or password to login to an existing user account. The user can also provide proof of innate biological characteristics through devices such as fingerprint readers, retinal scanners, voice recognition algorithms, and so forth. The user can also provide information that only the user would know in the form of answers to security questions, such as "What was your high school mascot?" After receiving any of this information from the user, the website may then verify that the information is accurate in an attempt to verify that the asserted user identity is authentic. However, even when the information is verified to be accurate, it is no guarantee that a malicious actor has not procured that information through covert means with the intent to misappropriate and/or abuse the user's identity.

The embodiments described herein utilize a new type of information to authenticate a user identity: actions that have been taken over a prolonged period of time by the user for which digital evidence is securely available. Specifically, some embodiments allow the user to login through the client device to a trusted third-party system that stores evidence of transmissions initiated by the user over an extended time interval. Next, the embodiments use an identifier associated with the user to access a second trusted third-party system to retrieve data vectors that are known to be descriptive of the asserted user identity and may include target values for monitored transmissions. The system can then group, filter, and/or manipulate a plurality of data rows received from the first third-party system to determine whether they can be matched to the data vectors received from the second third-party system. A confidence score can be calculated for each determined match between the two third-party systems and used to ultimately authenticate the user identity.

This process provides significant technical benefits over previous systems known in the art. For example, even if a malicious actor were to gain access to the user credentials and identifiers of the user identity, the malicious actor would need to take actions on behalf of the user over an extended time interval in order to fool the system. Additionally, many of the actions that must be taken by the malicious actor would require significant technical and/or monetary investment on their part. Most malicious actors would be deterred by the sheer scope of online activities that would be required to impersonate the user identity over an extended time interval. Furthermore, the malicious actor would need to steal user credentials for each of the trusted third-party systems, many of which require two-factor authentication and conduct their own independent anti-fraud activities. Each of these technical benefits of the embodiments described herein represents significant hurdles that almost assuredly will cause most malicious actors to move on to an easier target.

The embodiments described herein allow a user to interact with the website, setting up a user account and providing confidential information to the website, any of which may be used to assert a user identity to the website. To authenticate the user identity asserted through the client device, the website can first allow the user to login to a first trusted third-party system. In some embodiments, the first trusted third-party system may include an aggregator computer system that records and executes electronic transmissions on behalf of the user. For example, an email server can both receive and send electronic transmissions on behalf of a user. The website may allow the user to securely login to the aggregator computer system without exposing any user credentials to the website, then securely retrieve a list of data rows that describe electronic transmissions sent to and received by the aggregator computer system. Next, the client device can securely provide a user identifier that the website can use to log into a second trusted third-party system, such as a monitoring computer system. The monitoring computer system may be characterized in that it monitors electronic transmissions from the aggregator computer system to one or more receiving computer systems. The monitoring computer system may additionally or alternatively receive confirmations from the one or more receiving computer systems when such transmissions have been received successfully. The monitoring computer system may also record target data values that are expected to be received by the one or more receiving computer systems. To authenticate the user identity, the website can download a plurality of data vectors representing each of these target data values from the monitoring computer system and compare those to information extracted from the plurality of data rows received from the aggregator computer system. This comparison operation may include complex and/or iterative grouping and filtering operations to remove extraneous information from the data rows received from the aggregator computer system and determine if and/or how they can be matched correctly to the corresponding data vectors from the monitoring computer system. Different types of matches can be made between the two systems based on a type provided by the monitoring computer system for each data vector. In some embodiments, a confidence score can be generated for each match and processed to determine whether the user identity can be authenticated.

This system for authenticating a user identity can have numerous applications. The first trusted third-party computer system can include any type of computer system that sends or receives digital transmissions on behalf of the user. In one example, the third-party system may include an email server, an instant messaging application, and so forth. User accounts on any system that sends/receives physical packets on behalf of a user may also qualify. The monitoring computer system can be designed and offered specifically by parties that monitor online activities and/or other relationships established by the user. Alternatively, the monitoring computer system can be established specifically to handle this method of user identity authentication.

FIG. 1A illustrates a simplified block diagram of the different external systems and trusted third-party computer systems that may be involved in authenticating a user identity, according to some embodiments. The user may access the website 108 through a client device 102. The client device 102 may include any computing device, such as a smart phone, a smart watch, a PDA, a laptop computer, a desktop computer, a tablet computer, a voice-activated digital assistant, an augmented reality device, a virtual reality device and/or any other computing device that can receive inputs from the user and provide outputs. As used herein, the term "website" may include a traditional website or web form accessible through a web browser on a computer. This term may also encompass network-based access to a web server through an application running on a smart phone. Thus, claims referring to a website also encompass accessing a web resource through a dedicated application ("app") on a smart device, as well as through a traditional web browser.

The user may assert a user identity to the website 108. An identity assertion may include the providing of any information by the client device 102 to the website 108 to establish a particular identity. The identity assertion may include logging into an existing user account, registering for a new user account, and/or providing any information that could distinguish the user in comparison to other users. The information may include biometric information; secret information such as usernames, passwords, personal identification numbers (PINs), or secure tokens; and/or information regarding historical facts or personal preferences of the user. The identity assertion can be made passively by navigating around the website and/or actively by explicitly providing information and/or interacting with website controls. In some embodiments, an identity assertion may also be coupled with the providing of a user identifier 104 from the client device 102. The user identifier 104 may include an identification number that uniquely identifies the user in relation to other users. The website 108 can store the user identifier 104 securely, and/or may discard the user identifier 104 when a current communication session is terminated. The identity assertion can be part of an application process or part of a request for a resource provided by the website 108. Before taking certain actions, the website 108 can determine that the asserted identity from the client device 102 should be authenticated before the resource is provided, the user account is established, and/or any other action related to the user identity is taken.

To authenticate the user identity, the website can communicate with an aggregator computer system 174. The aggregator computer system 174 may receive transmissions 171 from any number of other computer systems. The transmissions 171 received from other computer systems can be stored as data rows in a data structure. Each of these data rows may include information descriptive of the transmission 171, such as a timestamp, a text field with descriptive information, a numerical field with the data value, one or more type fields classifying the type of transmission, one or more type fields indicating whether the transmission is an input or an output, and/or the like. These fields in the data rows may be described in greater detail below in relation to FIG. 4. As used herein, the term "data rows" may be used to represent any node in a data structure. The data rows from any source can be stored in a specific data structure associated with the user. For example, this may represent an actual row of data in a traditional database table. Each data row may be a data structure received in an array of data structures. A data row may also represent a node in a linked list, an element in an array, a field in an XML document, and so forth.

In addition to receiving transmissions from the other computer systems, the aggregator computer system 174 may also send transmissions 173, 176 to one or more receiving computer systems 178. The transmissions 173, 176 may include data payloads and/or may include information describing other digital or physical transmissions from an entity associated with the aggregator computer system 174 to an entity associated with each receiving computer system 178. The plurality of data rows 173 stored by the aggregator computer system 174 may also include data rows that are descriptive of the transmissions 173, 176 made to the receiving computer systems 178. In some embodiments, multiple transmissions 173 may be made to a single receiving computer system 178-1. These transmissions may be scheduled to take place at regular intervals and/or may be executed at any times determined by the user. Other receiving computer systems 178-2 may only receive a single transmission 176 during a particular time interval.

To access the plurality of data rows 173, the website 108 can download a copy of the plurality of data rows 173 from the aggregator computer system 174. In some embodiments, the website 108 can communicate directly with the aggregator computer system 174 to download the plurality of data rows 173. In other embodiments, the website 108 may require user credentials 105 to access the plurality of data rows 173 at the aggregator computer system 174. In these embodiments, the website 108 can use an external data store 132 with an API or web service 130 that allows the user to login to the aggregator computer system 174 through the client device 102 without providing the credentials 105 to the website 108. The external data store can then download the plurality of data rows 173 from the aggregator computer system 174. The website can then establish a secure link with the external data store 132 and retrieve the plurality of data rows 173 from the external data store 132 without needing to securely access the aggregator computer system 174. This process will be described in greater detail below in relation to FIG. 3. In some embodiments, users may have data structures stored at a plurality of aggregator computer systems (not shown for clarity). The external data store 132 can be used to login and download a plurality of data rows from each of the aggregator computer systems that may send transmissions that are monitored by the monitoring computer system 180.

The system may also utilize and/or access a monitoring computer system 180. The monitoring computer system 180 may provide a number of different services associated with the activities of the user. In some implementations, the monitoring computer system can store a plurality of data vectors 182, each associated with one of the receiving computer systems 178. The data vectors 182 may include a text field that describes and/or identifies the associated receiving computer system or an entity associated with the associated receiving computer system. Each of the data vectors 182 may also include a target value that describes an aggregate value for each of the transmissions received by the associated receiving computer system during a defined time interval. In some implementations, the monitoring computer system 108 may also receive inputs from each of the receiving computer systems 178 that characterize the transmissions 173, 176 received from the aggregator computer system 174 on behalf of the user. For example, the monitoring computer system 108 can record when/if each of the transmissions 173, 176 are received by the corresponding receiving computer systems 178. The monitoring computer system 180 may include separate data structures storing a plurality of data vectors for each of a plurality of different users.

As will be described in greater detail below, the website 108 can compare information from the plurality of data rows 173 downloaded from the aggregator computer system 174 with the plurality of data vectors 182 provided by the monitoring computer system 180. To extract the plurality of data vectors 182 for the user, the website may receive a user identifier 104 from the client device 102. The user identifier 104 may include any alphanumeric code that can be used to uniquely identify a user in relation to other users of the website 108. The website 108 can receive and securely store the user identifier 104 from the client device. Additionally, the website 108 can provide the user identifier 104 to the monitoring computer system 180 to receive a download of a copy of the plurality of data vectors 182 for the specific user. The website 108 can securely store the plurality of data vectors 182 for each user such that authenticating a user identity can be done without necessarily requiring a new request to the monitoring computer system 180.

Figure 1B:
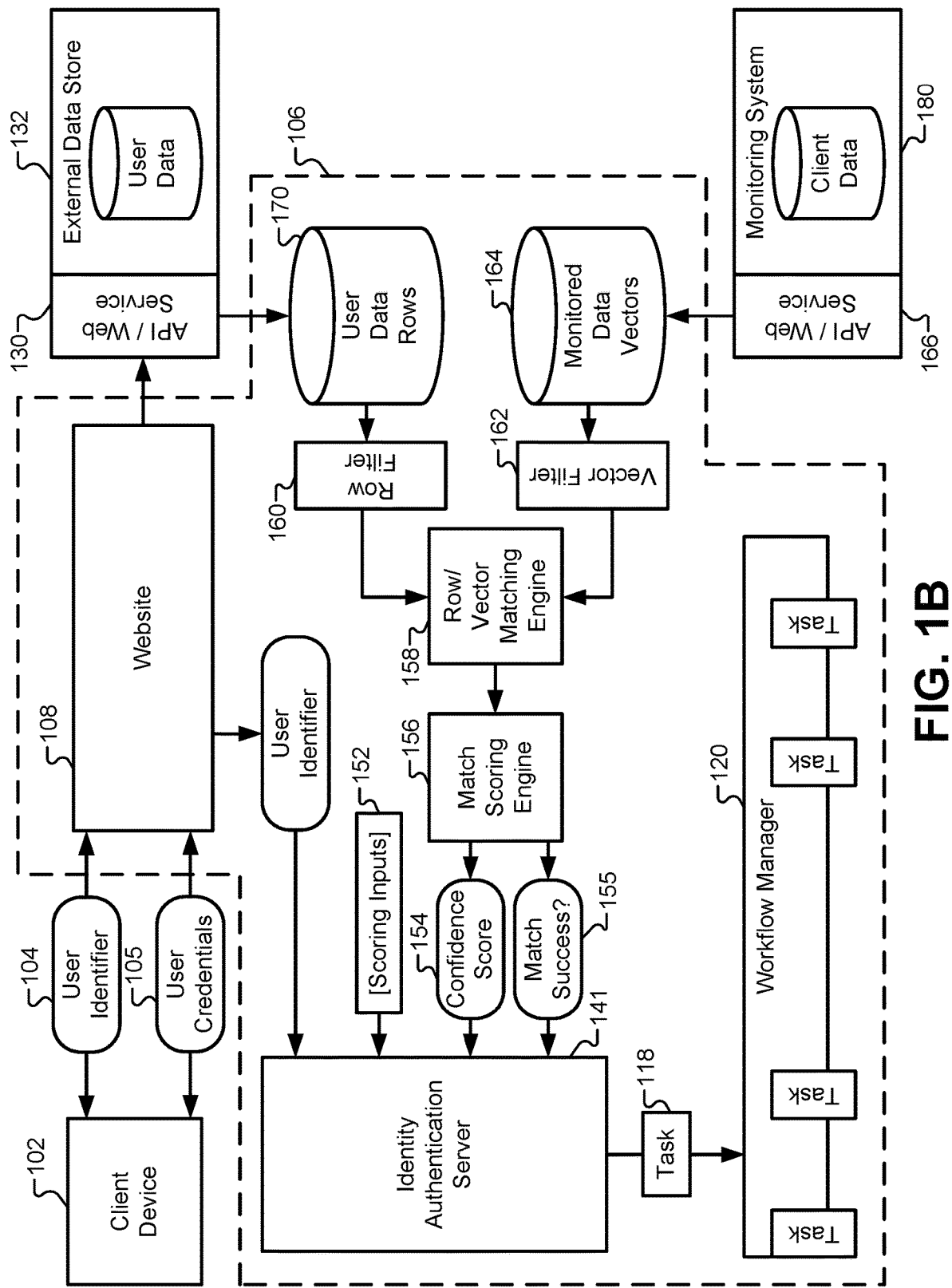
FIG. 1B illustrates a block diagram of a system with a front-end website, according to some embodiments.

FIG. 1B illustrates a block diagram of a system 106 with a front-end website 108, according to some embodiments. For example, the system 106 can present a publicly accessible website 108 to which the client device 102 can be communicatively coupled through a network. For example, a user can login to the website 108 on their smart phone client device 102 over a mobile cellular network. The client device 102 may be operated by a user who intends to explore various resources that may be available to the user via the website 108. The client device 102 may communicate through a network, such as a local area network, a wide-area network, the Internet, a cellular network, and so forth, using a network interface application, such as a web browser or an app operating on a smart phone.

In some embodiments, the website 108 may be hosted by a cloud service and provided through a content delivery network (CDN) that hosts websites, web content, and/or web services for the system 106. The cloud service may include server caches that are geographically distributed over a service area and provide the website 108 to the client device 102 upon request. The website 108 may include programming code, such as JavaScript, that provides front-end functionality to the website 108 when interacting with the client device 102. For example, the website 108 can solicit information required to generate resource recommendations to the user by walking the user through a series of web forms. The website 108 can also use information supplied by the client device 102 to solicit information from third-party, external data stores.

The website 108 is used merely as an example of one of the ways that the cloud system 106 can interact with the client device 102. Therefore, this disclosure should not be limited to a website per se. Instead, the term website 108 throughout this disclosure may be replaced with any user interface capable of receiving data from the client device 102 and transmitting data between the client device 102 and the website 108. For example, another embodiment can provide a voice activated, audio interface for communicating with client devices through voice services such as Alexa® by Amazon® or Google Home®. Another embodiment can use an entertainment dashboard in a vehicle as an interface for communicating with the client device 102. Similarly, the web forms that may be presented through the website 108 are also used merely as an example that is specific to the website 108 environment. In this disclosure, the term "web form" may be replaced with any sort of digital form that can present and receive information to an user through the particular user interface. For example, the form could include interactive user interface elements displayed in an application running on a smartphone or smartwatch. In another example, the form could include audio provided to an user and audio received from an user in a voice-activated user interface. Therefore, the terms "website" and "web form" are merely used as examples, and are not meant to be limiting.

After receiving information from the client device 102, the website 108 may receive a request from the client device 102 to perform an action or access a set of resources that may require the asserted user identity to be authenticated. In some embodiments, the resources may include any network resource, such as access to a computing system, services that may be available to the user, digital content that may be downloaded to the client device 102, and so forth. In some embodiments, the set of resources 114 that may be initially provided to the user may be based at least in part on the successful authentication of the user identity. The initial set of resources 114 can be presented to the user on the client device 102, and the user may input a selection of one of the set of resources 114 to the client device, which can then be transmitted back to the website 108.

The particular arrangement and grouping of computing devices and computer systems in FIG. 1B is merely exemplary and not meant to be limiting. In some embodiments, the website 108 (or other equivalent user interface) may be hosted and/or provided by a proprietary data center owned and operated by the website provider, thereby eliminating the need for any third-party cloud service to host computer resources. In some embodiments, the website 108 and all the functionality of the system 106 may be hosted by one or more cloud services. In some embodiments, the website 108 may be hosted on a web server that is an integral part of the website provider's private data center.

Before the user identity can be authenticated, the system 106 can use the process described below in relation to FIG. 3 to download a plurality of data rows 173 from the external data store 132. The plurality of data rows 173 can be stored in a data store 170 in a data structure that is specifically associated with the user of the client device 102. Thus, the plurality of data rows 173 can be used immediately to authenticate the user identity, as well as in the future if the user identity needs to be re-authenticated. Therefore, the embodiments described herein provide a way for the system 106 to automatically verify the identity of the user using a proprietary process described below.

To verify an user's identity, the system 106 can use the user identifier 104 to download a plurality of data vectors from the monitoring computer system 180. In some embodiments, the monitoring computer system may include an API or web service 166 through which the plurality of data vectors can be downloaded. The system 106 can store the plurality of data vectors in a data store 164 for the user. In some embodiments, data store 164 and data store 170 may be combined into a single data store that stores personal information for the user. As described above, the stored data vectors and/or the stored data rows can be used to service future as well as current requests. Therefore, the system can service future identity authentication requests without going to the external data store 132 and/or the monitoring computer system 180. In some embodiments, specific portions of the data vectors can be extracted and/or saved that may be needed for the identity verification algorithm described below.

When received and/or stored, the plurality of data rows and/or the plurality of data vectors may be formatted in a unified data format that can be readily used by any of the internal modules in the system 106, such as a JSON format. Additionally, the text fields of the plurality of data rows and/or plurality of data vectors may include extraneous text that may purposefully and/or incidentally obscure the text that could identify the associated receiving system. Therefore, a row filter 160 and/or a vector filter 162 can perform various filtering operations using regular expression replacement functions to cleanse the text field for each of the rows/vectors as will be described in greater detail below.

To verify the user's identity, the row/vector matching engine 158 can identify transmissions made from the aggregator computer system 174 that correspond to target data values identified by the target values of the plurality of data vectors. Specific processes may be used to match data rows and data values having specific types specified by the monitoring computer system 180, such as Type I, and Type II, and/or Type III described below. A match scoring engine 156 can be configured to provide a confidence score for each match established between the data rows and data vectors. An algorithm described below can evaluate various matching criteria used to assign a confidence score 154 to the match. The confidence score 154 can be provided as an input to an identity authentication server 141. In some embodiments, the match scoring engine 156 can also send an indication 155 as to whether or not at least one matching algorithm was successful. This indication 155 can be sent in addition to, or in the place of, the confidence score 154. If at least one of the matching algorithms described below for one of the data vector types is successful, then the identity authentication server 141 can add a predetermined number of points to an internal "identity score." Because the identity authentication server 141 can accept scoring inputs 152 from various sources, the output of the match scoring engine 156 may contribute to an overall identity score, rather than being determinative on its own. In other embodiments, the output of the match scoring engine 156 may be sufficient to authenticate the identity for the entire system 106. If the scoring is not conclusive, then a manual process may be initiated for authenticating the user identity.

Additionally, the identity authentication server 141 can interface with a workflow manager 120 to add/remove tasks from a workflow associated with a process associated with the user. If the user's identity can be automatically verified based on the embodiments described herein, the identity verification server 174 can instruct the workflow manager 120 to remove the task related to verifying the user's identity. Similarly, if the data rows cannot be matched to the data vectors with a high enough confidence score, a new task 118 can be added to the workflow manager 120 requiring subsequent review and/or manual authentication of the user's identity before a resource is provided.

Figure 1C:
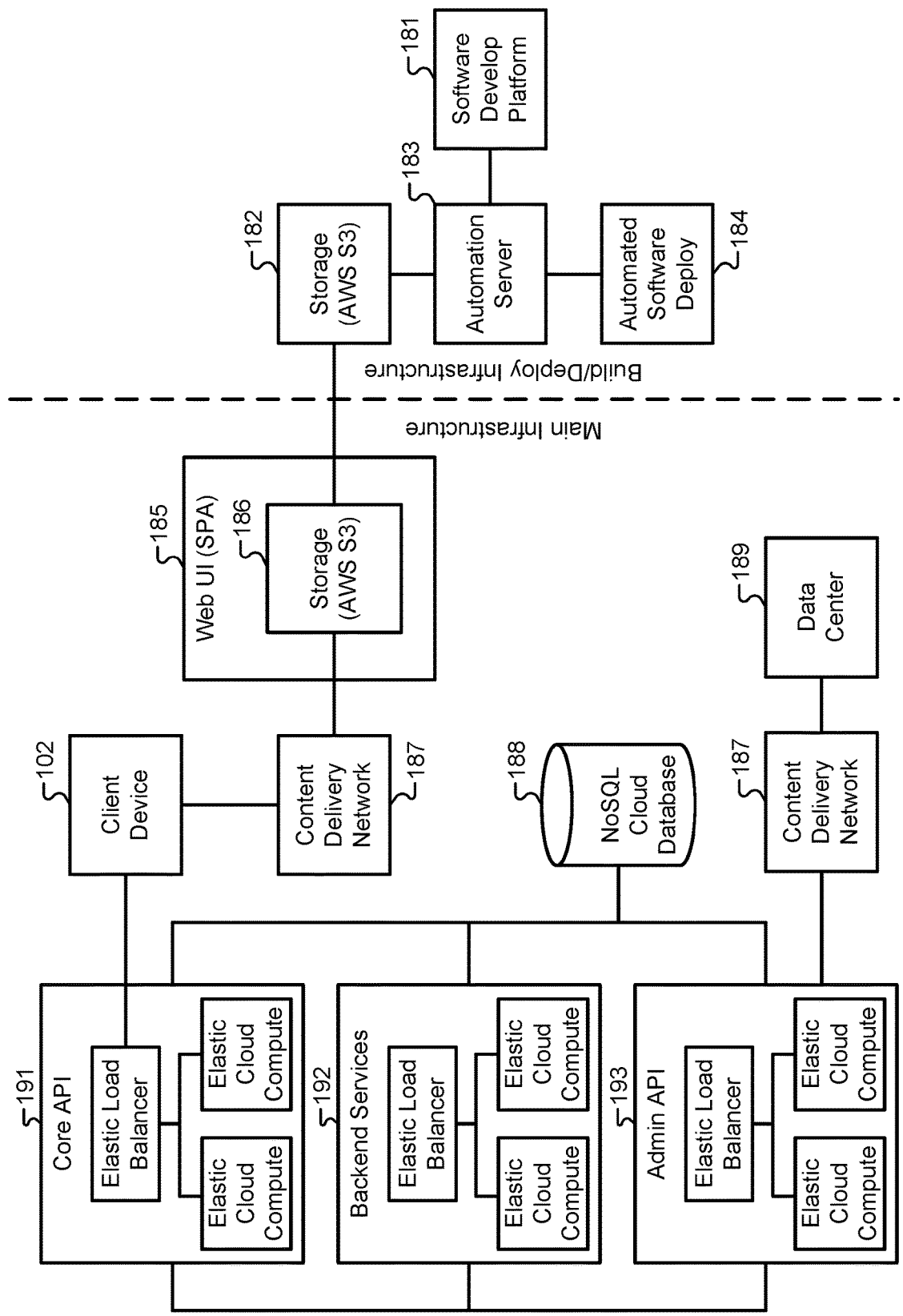
FIG. 1C illustrates an architectural diagram of the system as deployed in a cloud-based infrastructure, according to some embodiments.

FIG. 1C illustrates an architectural diagram of the system 106 as deployed in a cloud-based infrastructure, according to some embodiments. The infrastructure includes a build/deploy infrastructure with a software development platform 181 to develop backend processes and/or front-end web interfaces for presenting resources to a client device and authenticating a user identity. The software development platform 181 may include a collaborative platform that allows developers to build software, review code, manage projects, manage software versions, and/or perform other tasks in the software development pipeline. For example, a platform such as GitHub® may be used.

The build/deploy infrastructure may also include an automation server 183 that can be used to automate non-human parts of the software development process and to augment the output of the software development platform 181. For example, some embodiments may use an open source automation server such as a Jenkins server. Alongside the automation server 183, an automated software deployment system 184 can automate the deployment of software packages to a variety of computing services in the cloud infrastructure. Some implementations may deploy the software to a cloud computing service, such as the Amazon Web Services (AWS). In these implementations, the automated software deployment system 184 may include utilities such as the AWS CodeDeploy®, along with a storage repository 182 such as the AWS S3® system.

Deployed code can be stored in a separate storage repository 186 to be used directly by a web user interface 185 for presenting the website 108 to the client device 102. Some embodiments may use a single-page application (SPA) scheme that dynamically rewrites the website 108 rather than loading entire new pages from the server. The website may be deployed through a content delivery network 187 as described above. When using the AWS cloud, the CloudFront® CDN may provide a sufficient number and distribution of edge servers to provide the website 108 throughout a relevant geographic area. The client device 102 can interact through the content delivery network 187 with the website 108 as described above.

Three server-side components 191, 192, 193 on the left side of FIG. 1C can be configured to handle data requests from the website originating from the client device 102. A front-line service, such as a CoreAPI module 191 can be configured to do lightweight processing for the website 108. For example, the CoreAPI module 191 can handle data requests from the public-facing website for individual users. This can handle tasks such as account creation, login, process status, data uploads, and so forth. The CoreAPI module 191 may communicate directly with a backend service module 192 that handles data requests from the CoreAPI module 191 and an Admin API 193 to perform long-running operations, including operations involving third-party systems outside of the system 106. For example, the backend service module 192 can handle requests to the external data store 132, as well as implement the matching engine 158 and/or scoring engine 156 described in FIG. 1B. The Admin API 193 can handle data requests from internal administrative websites to provide internal, detailed information and reports regarding users and user processes that are currently underway.

Figure 2:
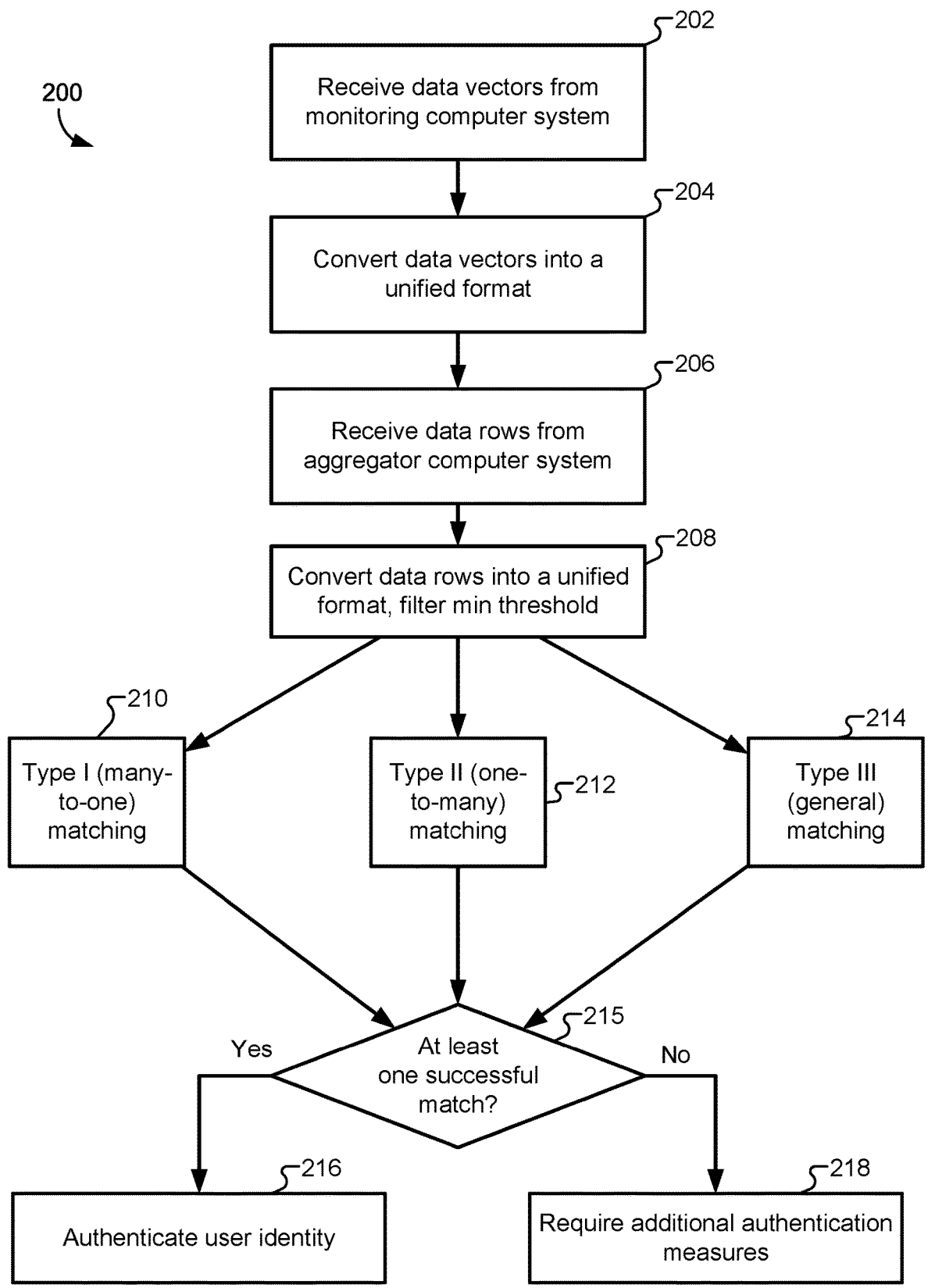
FIG. 2 illustrates a flowchart of a method for authenticating a user identity based on matching data rows and data vectors, according to some embodiments.

FIG. 2 illustrates a flowchart 200 of a method for authenticating a user identity based on matching data rows and data vectors, according to some embodiments. The flowchart 200 offers an overview of the entire process, and some steps may be discussed in greater detail in subsequent flowcharts. The method may include receiving data vectors from the monitoring computer system (202). These may be received using the process described below in relation to FIG. 1A. Namely, the user identifier 104 received from the client device 102 can be sent to the monitoring computer system 180 to retrieve the plurality of data vectors specific to that user. The data vectors may be converted into a unified format (204), such as a JSON format that can be read by all of the internal systems of the cloud system 106.

The method may also include receiving data rows from the aggregator computer system (206). The data rows may be received from the aggregator computer system when the client device 102 provides user credentials 105 directly to the aggregator computer system through the external data store 132. The system 106 can then download the plurality of data rows from the external data store 132 according to the process described below in relation to FIG. 3. As with the data vectors, the plurality of data rows can be converted into a single unified format (208). Additionally, some embodiments may filter out data rows that have numerical data value fields that do not exceed a predetermined threshold. This eliminates data rows that represent transmissions that are too small to be of consequence or are unlikely to be matched with corresponding data vectors. The actual threshold used for discarding data rows may be adjusted over time in an automated fashion by applying a machine learning algorithm to utilize the results of previous calculated scores. Thus, the threshold can be adjusted dynamically over time to become more accurate.

The method may then determine a type associated with each of the remaining data vectors. For example, some embodiments may include three different types referred to herein as Type I, Type II, and Type III. In some embodiments, these types may overlap. A data vector classified as Type I or Type II could also be classified as Type III. In some embodiments, Type I and Type II may be mutually exclusive. It will be understood that these types presented merely by way of example and not meant to be limiting. Other embodiments may use any number of types classified in any number of different ways. In some embodiments, the types may be determined by a type field associated with each data vector provided from the monitoring computer system. Different algorithms may be tailored to analyze each type of data vector in parallel and/or in series. In some embodiments, if any of the matching algorithms for any of the data vector types are successful (215), the user identity can be authenticated (216). If none of the matching algorithms are successful, then the system may require additional authentication measures (218) as described above in relation to FIG. 1B.

Figure 3:
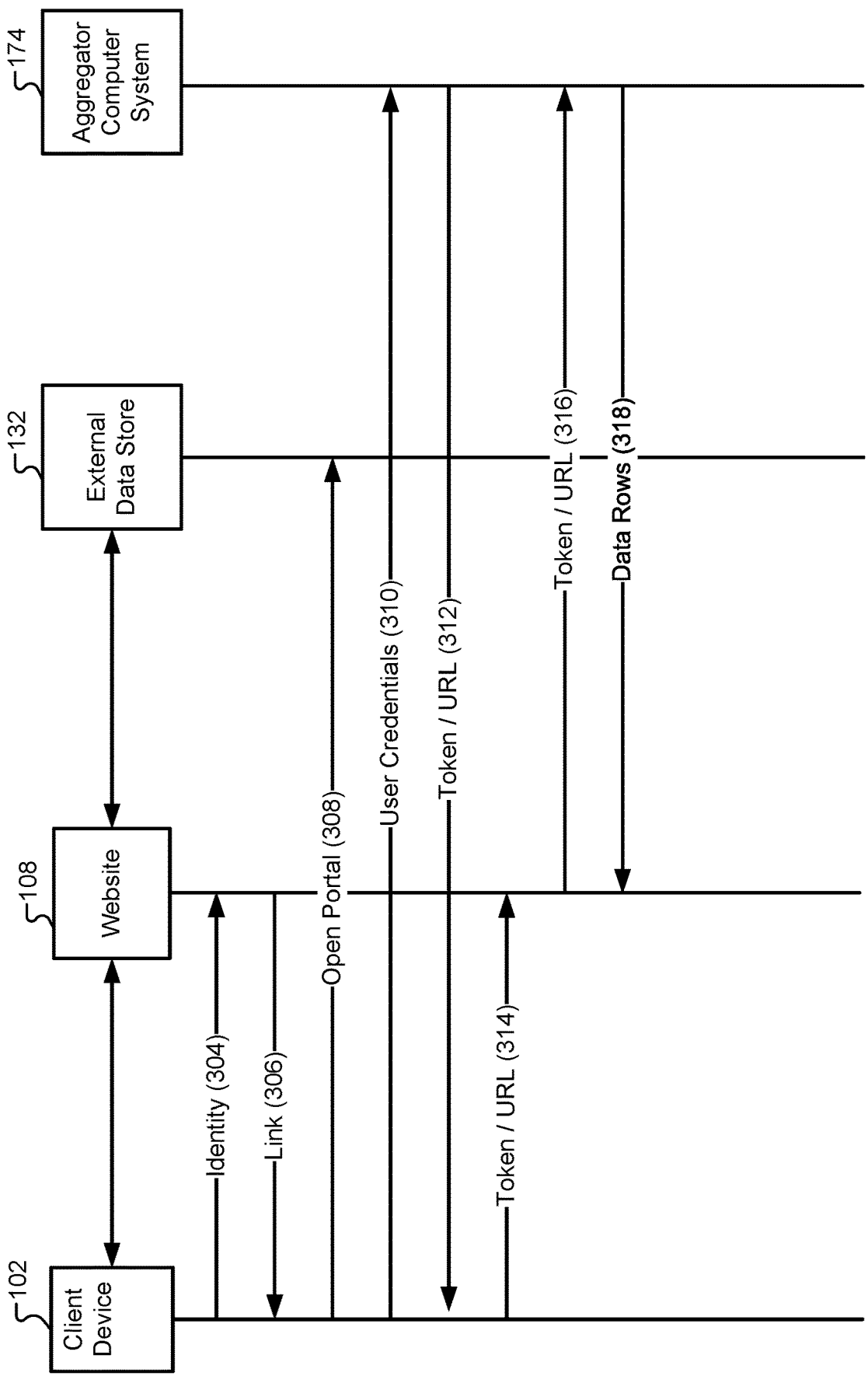
FIG. 3 illustrates a flow diagram of data rows being received from the external data store, according to some embodiments.

FIG. 3 illustrates a flow diagram of data rows being received from the external data store, according to some embodiments. The client device 102 can send the identity assertion (304) to the website 108. In order to authenticate the identity, the website 108 can provide a link (306) to the client device 102 to initiate the authentication process. For instance, the website 108 can provide a link, button, or other web control that asks the user to "Automatically Verify my Identity". In some embodiments, when the user clicks on the link, the client device 102 can open a portal (308) to the external data store 132. This may include a pop-up window or other browser display that allows the client device 102 to communicate directly with the external data store 132 without necessarily losing the communication session with the website 108.

While in communication with the external data store 132, the client device 102 can be queried and provide account credentials (310). In some embodiments, the external data store 132 may present a list of available aggregator computer systems that can provide data rows to the external data store 132, and the user can sequentially select each aggregator computer system that can provide data rows associated with the user. The external data store can then provide a login page for the aggregator computer system 174 and allow the user to supply their credentials directly to an interface of the aggregator computer system 174. In other embodiments, the external data store 132 can receive the credentials from the user and then provide a link for the aggregator computer system 174 to log in. Other inputs may also be received from the client device 102, such as selecting specific data structures related to the user for download to the website 108.

After one or more data structures have been selected by the client device 102, the aggregator computer system can transfer a token, URL, or other identifier to the client device 102 (312). The token/URL can be transmitted (314) to the website 108 such that the website 108 can retrieve the data rows from the aggregator computer system 174. Note that in some embodiments, the aggregator computer system 174 and/or the external data store 132 can transmit the token/URL directly to the website 108 without sending it through the client device 102 first. After receiving the token/URL, the website 108 can send the token/URL (316) to the aggregator computer system 174 to retrieve data rows from any data structure selected by the user. The aggregator computer system 174 can then transmit a list of data rows (318) to the website 108 for processing.

Note that the order in which the operations of FIG. 3 are carried out can vary in different embodiments. For example, in one embodiment, when a user clicks on the web control to "Automatically Verify my Identity", the website 108 can first retrieve the token/URL from the external data store 132 and pass the token/URL to the client device 102. The website 108 may then optionally facilitate the client device 102 searching for a specific aggregator computer system 174, although this process may also be controlled entirely by the external data store 132. Once an aggregator computer system 174 has been found and selected, all communication between the client device 102, the external data store 132, and the aggregator computer system 174 may occur outside of the system 106 and website 108. After the user logs into the aggregator computer system 174 as described above, the website 108 can use the token/URL to request the data rows for the user from the external data store 132. Generally, the website 108 need not request information directly from the aggregator computer system 174. Alternatively, the external data store 132 can contact the website 108 through a secure URL indicating that the user's data rows are ready to be downloaded using the previously provided token/URL.

It should be noted that allowing the client device 102 to open a portal with the external data store 132 and/or the aggregator computer system 174 bypasses the website 108. This prevents the website 108 from seeing or having access to credentials for the user's private data structures stored at the aggregator computer system. Instead, the website 108 can simply download a set of data rows from the external data store 132 and/or the aggregator computer system 174 without needing to provide any login credentials associated with the particular user. Thus, the website 108 does not need to store any user credentials or deal with the security requirements for logging into the external data store 132 and/or the aggregator computer system 174.

The set of data rows received from the external data store 132 and/or the aggregator computer system 174 may be formatted according to the requirements of the external data store 132 and/or the aggregator computer system 174. However, it may be advantageous to allow the website 108 to download data rows from many different aggregator computer systems using various external data stores 132 that provide access. Thus, the website 108 may need to deal with data row formats that vary greatly. Therefore, the system can provide software adapters that are specific to each external data store 132 and/or aggregator computer system 174. These software adapters can receive data rows in external formats, then translate those varying formats into a single, unified format that can be used by the identity authentication process. In some embodiments, the single format used by the data value estimation process can eliminate some fields provided by the external data store 132 and/or aggregator computer system 174, reformat some fields, add additional information to some fields, and so forth.

In addition to standardizing the format of the received data rows, some embodiments may also use regular expression replacement patterns to strip out extraneous information from a text field of the data rows. For example, some embodiments may remove text that is specific to the aggregator computer system. Some embodiments may remove non-alphanumeric and/or special characters from the text field. Some embodiments may insert a space between numerical characters and alpha characters. Some embodiments may remove date indications from the text field. Some embodiments may remove single non-whitespace characters and extra whitespace characters.

Some embodiments may also perform similar cleansing/filtering operations on the text fields in the data vectors from the monitoring computer system. Generally, some implementations of monitoring computer systems do not require as many regular expression replacement patterns as are typically used to process data rows from the aggregator computer system. For example, some embodiments may filter out numbers and/or apostrophes. Some embodiments may strip out strings of repeated characters, such as xxx-xxx-xxx. Some embodiments may strip out a list of blacklist expressions. This blacklist of expressions may be created and/or updated based on a manual analysis of data rows and/or data vectors. The process may determine that these expressions are common in unrelated data rows and/or data vectors and generally don't provide identifying information that can be used to match data rows to data vectors. These cleansing/filtering operations generally make matching data vectors to data rows based on text fields a simpler and more accurate process.

Figure 4:
FIG. 4 illustrates a sample plurality of data rows that may be received from a single data structure at an aggregator computer system.

FIG. 4 illustrates a sample plurality of data rows 400 that may be received from a single data structure at an aggregator computer system. These data rows 400 may have been formatted by the custom adapter of the system as described above. It will be understood that this set of data rows 400 is presented merely by way of example and not meant to be limiting. Many other data fields/columns may be included that are not specifically shown in FIG. 4 for clarity. In one example, the set of data rows 400 may include a field 404 that characterizes the data row as an input or an output from the perspective of the aggregator computer system, i.e. a characterization of whether this data row represents a transmission received by the cumulative computer system (an input) or a transmission sent from the aggregator computer system (an output). The characterization in field 404 may be made by the aggregator computer system when that particular data row is received. Each data row may also include a text field 406 that may provide a text code and/or textual description of the data row, a field 408 with a timestamp for when the data row was received, and a field 410 with a value for the data row.

In some embodiments, the external data provider may include a field 402 that further characterizes the data row as an input or an output. This field 402 can be used by the system to further filter the plurality of data rows 400. For example, when matching data rows to data vectors, only output data rows from the aggregator computer system will be received by receiving computer systems and monitored by the monitoring computer system. Therefore, some embodiments may filter out all rows not identified as outputs in FIG. 4.

Figure 5:
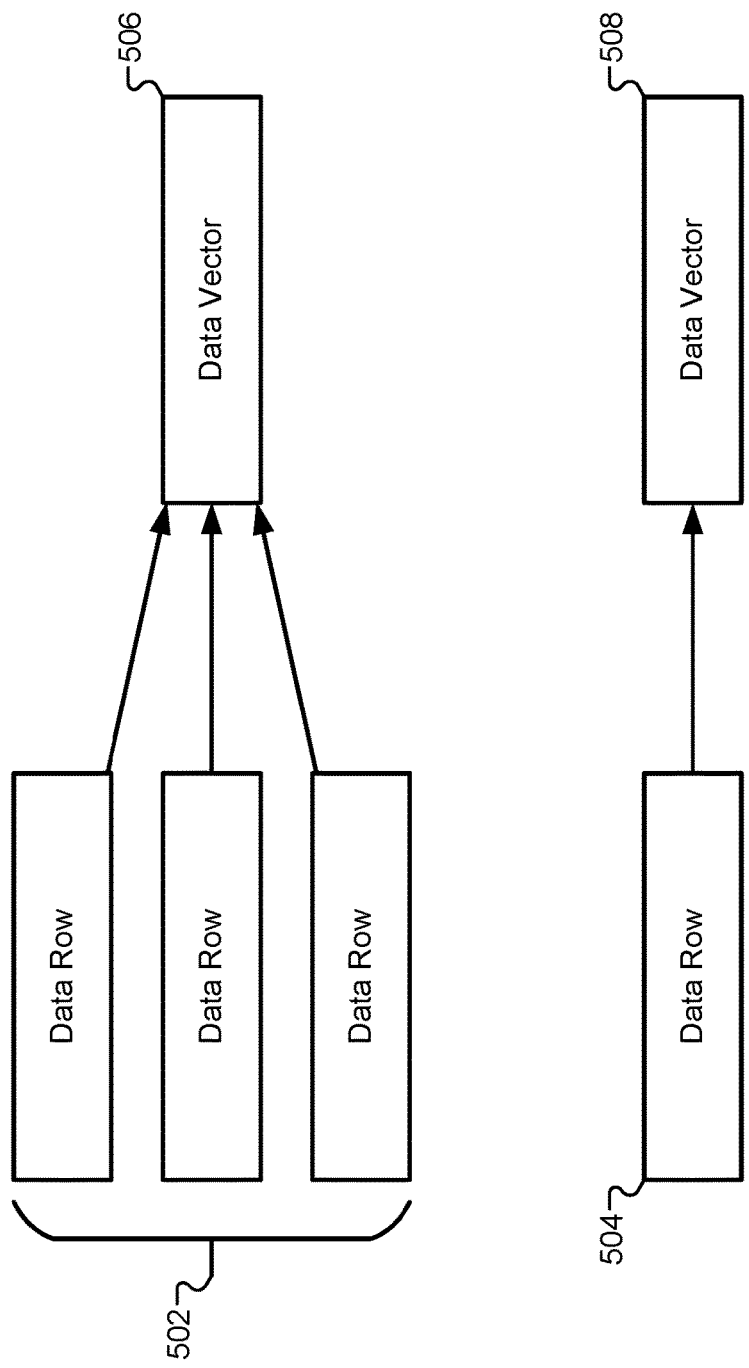
FIG. 5 illustrates a diagram for classifying a first type of data vector, according to some embodiments.

FIG. 5 illustrates a diagram for classifying a first type of data vector, according to some embodiments. As described above, each data vector may include a field that classifies the data vector as a certain type. The system can read the type provided with each data vector and classify that data vector into a corresponding internal type. For example, one or more types provided by the monitored computer system may be classified as a Type I data vector for the identity authentication process. In addition to using the classification provided by the monitoring computer system, some embodiments may also use characteristics of each data vector to further classify data vectors as Type I. For example, Type I data vectors may include a many-to-one relationship between data rows and data vectors. In the example of FIG. 5, three data rows 502 may each be related to a single data vector 506. One-to-one relationships are also allowed in the Type I data vectors, such as data row 504 and data vector 508. In some embodiments, Type I data vectors may be classified based on their importance in authenticating an identity. For example, Type I data vectors may be particularly difficult for a malicious actor to use to fool the system.

Figure 6:
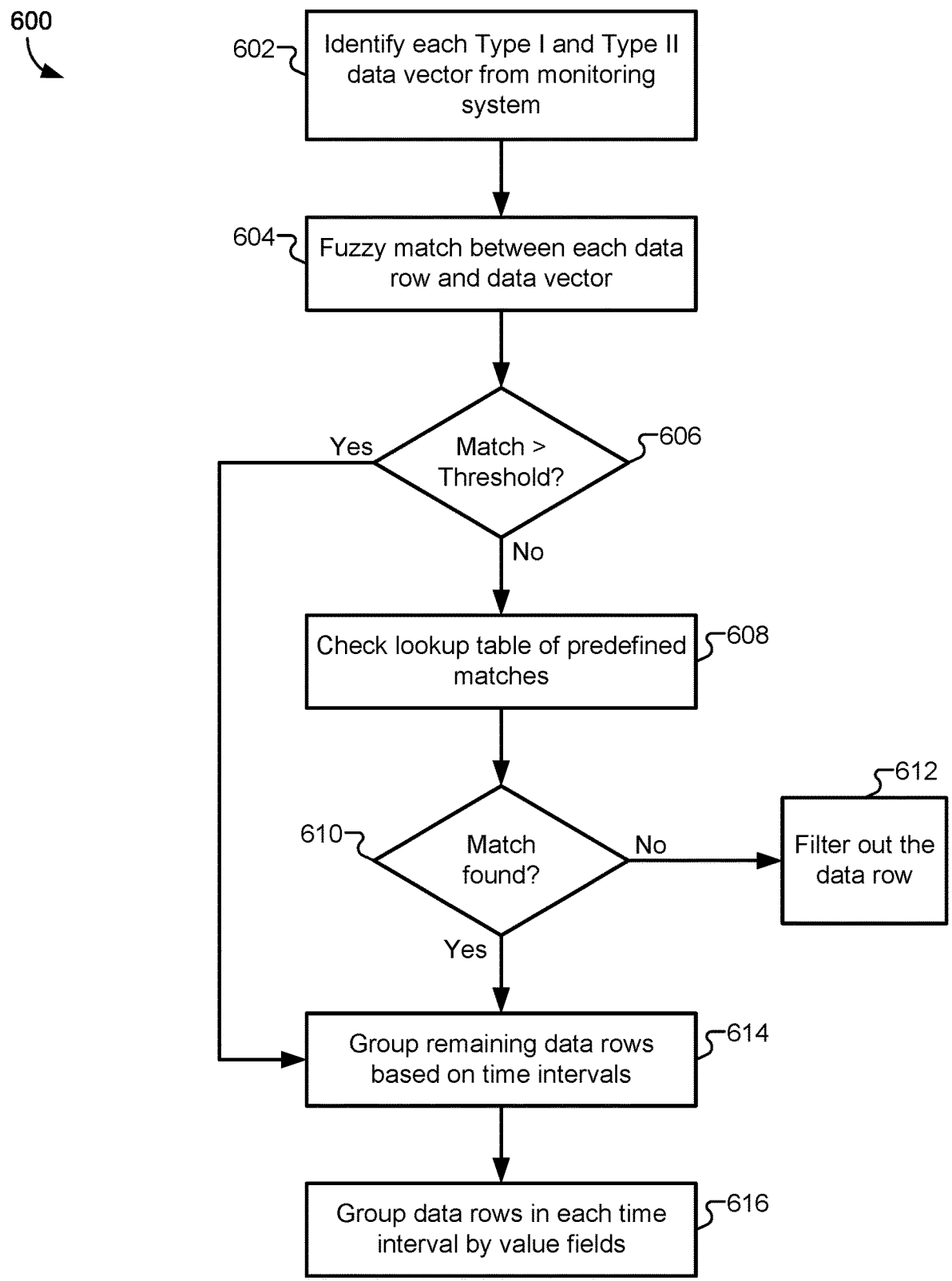
FIG. 6 illustrates a flowchart of a method for filtering and grouping data vectors that are classified as Type I and/or Type II data vectors, according to some embodiments.

FIG. 6 illustrates a flowchart of a method 600 for filtering and grouping data vectors that are classified as Type I and/or Type II data vectors, according to some embodiments. The classification of Type II data vectors is described below in relation to FIG. 9. The method may include identifying each Type I and Type II data vector from the monitoring computer system (602). As described above, this may be based on a type provided from the monitoring computer system, characteristics of the fields in the data vector, and/or the relationships between the data vector and the plurality of data rows.

The method may also include performing a number of preliminary filtering operations to eliminate data rows that are not relevant to the Type I and Type II matching process. These filtering operations can be used to remove obvious mismatches from the more processor-intensive matching algorithms described below. This can improve the performance of the process by limiting the number of complex-computation operations performed in matching the data vectors to the data rows. One filtering operation may include performing a fuzzy match between the text field in each of the data rows and the text field in each of the data vectors (604). A library providing fuzzy text match functions may be used. These libraries may accept two input strings and generate a score based on how closely they could be matched. Because the text fields have been cleansed of extraneous information by some embodiments, a fairly low threshold may be used to generate a match score between the data vectors and data rows. For example, some embodiments may use a threshold of 25%. Other embodiments may use different thresholds, such as 15%, 20%, 30%, 35%, 40%, 50%, and so forth. Generally, because of the ordering and combination of these steps of cleansing the text fields before applying the fuzzy match algorithm, the processing power and/or memory used by the fuzzy match algorithm can be significantly reduced, and matches can be more readily found with lower thresholds, thereby reducing the time required by the fuzzy match algorithm. If the fuzzy match score is greater than the threshold (606), then the data rows can be grouped as described below.

A second preliminary filtering operation may include checking a lookup table of predefined matches (608). For each data row, a determination can be made whether a corresponding data vector exists according to a predefined map of descriptions. As matches are made over time as described below, information in data rows that is confidently determined to correspond to a text field in a data vector can be stored in a lookup table. If a match is found (610), then the data rows can be grouped as described below. However, if a match is not found, then it can be determined that the data row failed both preliminary filtering operations by failing both the fuzzy match and the predetermined lookup table match. At this point, data rows that failed both preliminary filtering operations can be removed from consideration for the Type I Type II processes (612).

Data rows that survived the preliminary filtering can now be grouped according to time intervals (614). In some embodiments, the timestamp associated with each data row can be used to group data rows together that occur within a predetermined time interval, such as within the same month. In some embodiments, the time intervals can be based on time intervals corresponding to the Type I/II data vectors. For example, if a data vector indicates that transmissions should be sent on bi-weekly basis, then the predetermined time interval for the data row grouping can be two weeks.

After grouping data rows based on time intervals, the data rows can then be grouped within each time interval by value fields (616). For example, all data rows in a single time interval having the same absolute value in the value field can be grouped. Each group can be characterized by (i) a number of data rows in the group, (ii) the lowest fuzzy-match score in the group of data rows, and (iii) whether any of the data rows matched data vectors based on the lookup table of predetermined matches.

Figure 7:
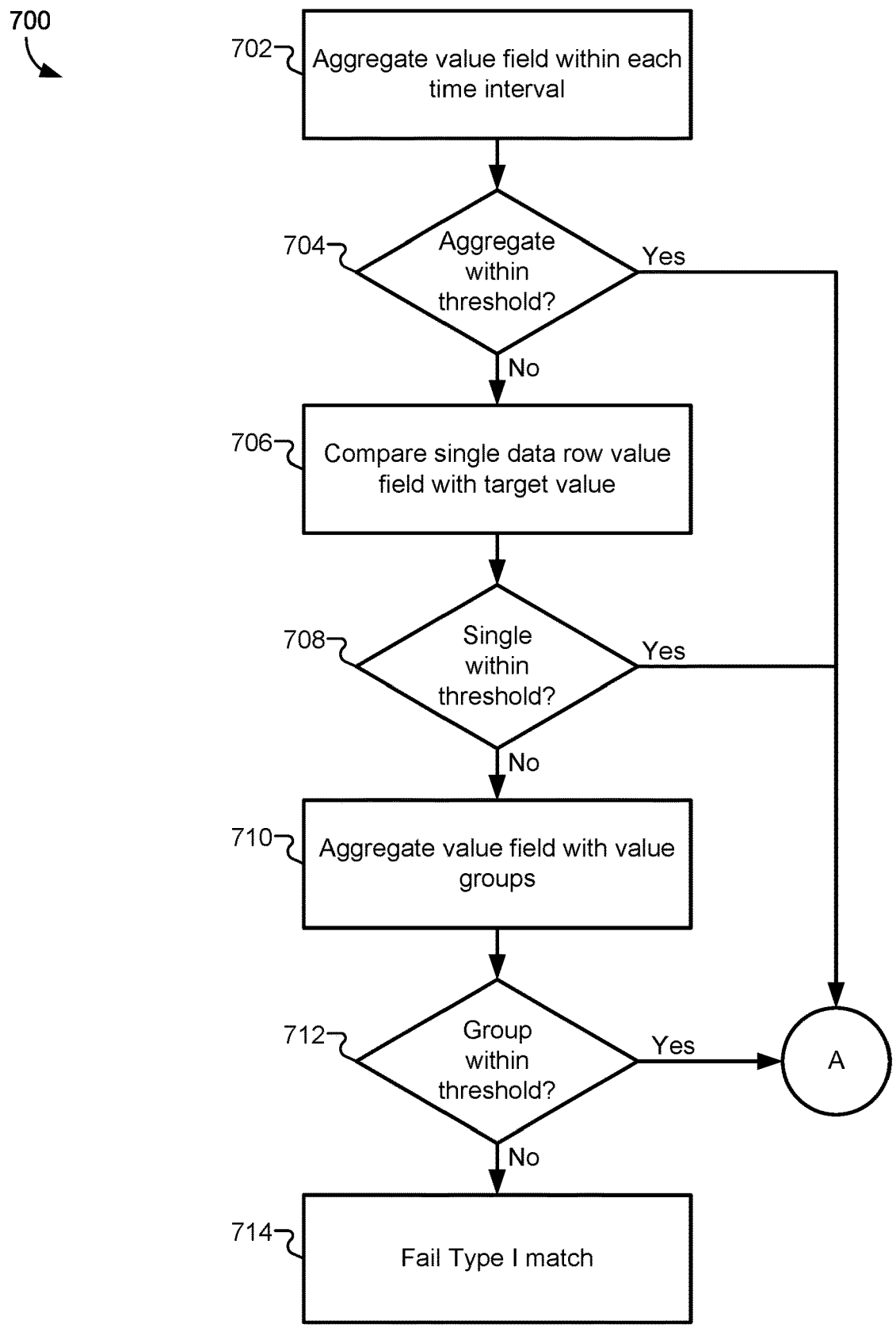
FIG. 7 illustrates a flowchart for a method of determining a Type I match, according to some embodiments.

FIG. 7 illustrates a flowchart 700 for a method of determining a Type I match, according to some embodiments. The process described above for performing preliminary filtering and grouping can be used on both Type I and Type II data vectors. However the process of flowchart 700 is specifically tailored to handle Type I data vectors. The method may include aggregating the value fields within each time interval (702). For all the data rows that are grouped within a single time interval and/or amount, the data value fields can be aggregated together to generate a group value for the time interval. The aggregated value can then be compared to the corresponding numerical field in each of the data vectors (704). If the aggregate amount is within a threshold of a data vector value, then the data vector may qualify as a potential match. The threshold value may be very small, as it is expected that numerical values from data rows will closely match the corresponding numerical values in the data vectors. For example, threshold values may include 1, 2, 5, 10, 15, and so forth. This operation may correspond to the many-to-one relationship described above in relation to FIG. 5.

If the aggregated total for all data rows in the time interval and/or amount do not match the numerical value of a data vector, then comparisons can be made between each single value field within the group and data rows and the numerical value of the data vector (706). This operation may correspond to the one-to-one relationship described above in relation to FIG. 5. If a single value is found to match one of the Type I data vectors within a threshold amount (708), then the data vector can be saved as a potential match.

If neither the aggregate total of the group nor any of the single values for the data rows in the group match any of the data vectors, then various combinations of data rows can be tried to see if any aggregate totals of subgroupings within the group will fall within a threshold amount of a data vector (710). Group sizes can be gradually increased from 2 to 3 to 4 and so forth in each permutation available to determine whether any of the combinations will fall within a threshold amount of a data vector value (712). In some embodiments, the groups may be already grouped by amount as described above, thus this operation can multiply the group amount by 2, 3, 4, and so forth until it exceeds the values of the data vectors. Similar threshold values may be used as described above for each of these operations. If a combination falls within a threshold amount, it can be saved as a potential match. However, if no combinations fall within a threshold amount, then the Type I match may fail (714).

Figure 8:
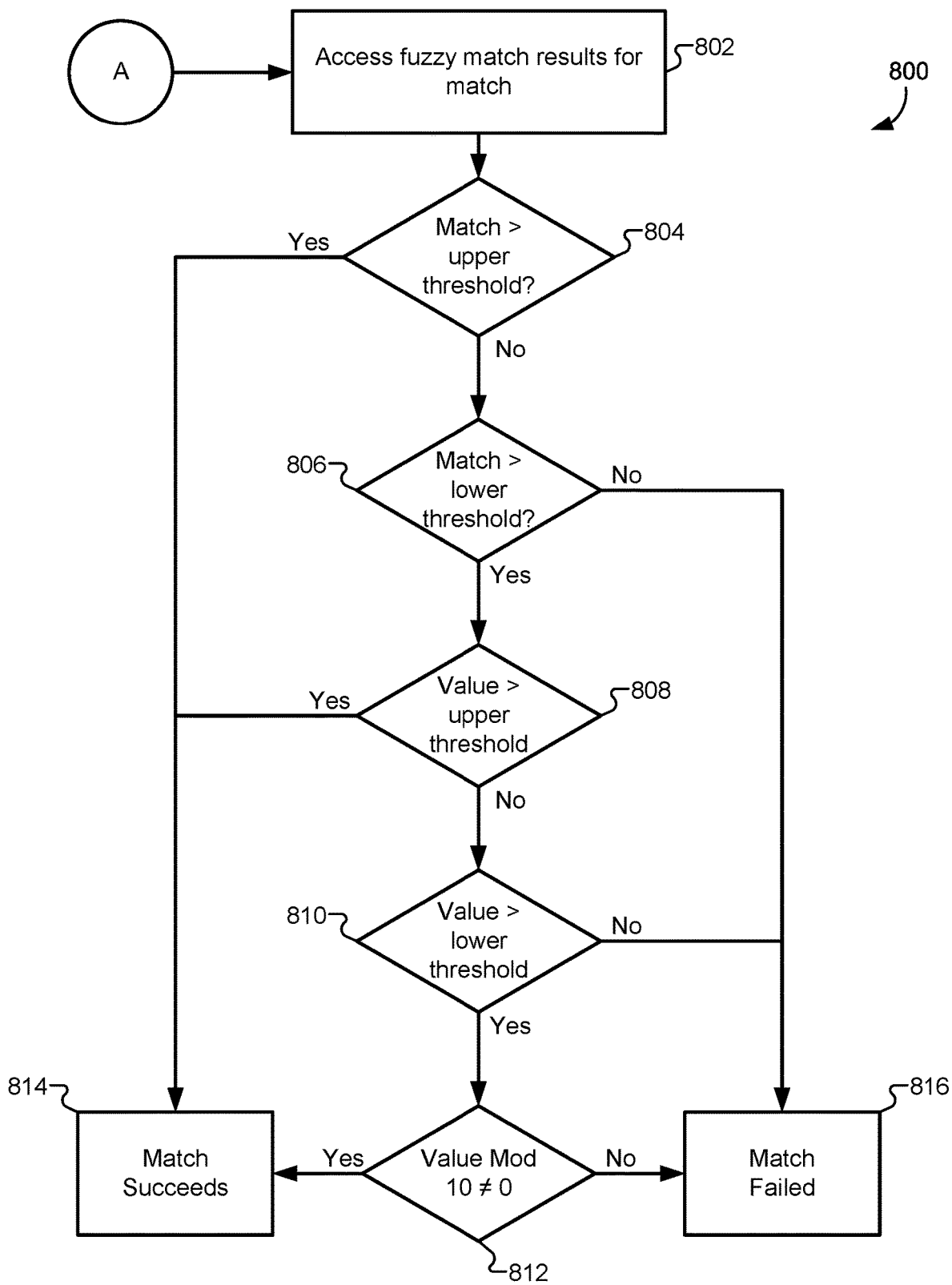
FIG. 8 illustrates a flowchart of a method for finalizing a match for Type I and/or Type II data vectors, according to some embodiments.

FIG. 8 illustrates a flowchart 800 of a method for finalizing a match for Type I and/or Type II data vectors, according to some embodiments. Continuing from flowchart 700, the method may receive each of the potential matches for Type I data vectors. Each of the data rows matched to a data vector may already have computed a fuzzy match result between the text field of the data rows and the text field of the data vector, which may be accessed and/or recalculated if needed (802). First, the fuzzy match score can be compared to an upper threshold. The upper threshold may be a value such as 40%, 45%, 50%, 55%, 60%, 65%, and/or the like. If the fuzzy match score exceeds the upper threshold (804), then the match can succeed (814). If not, then the fuzzy match score can be compared to a lower threshold. The lower threshold may include values such as 15%, 20%, 25%, 30%, 35%, and/or the like. If the match score is lower than the lower threshold (806), then the match can be considered failed (816). If the fuzzy match score exceeds the lower threshold, then a determination can be made as to whether the value field in the data vector exceeds an upper threshold (808). The upper threshold may use values such as 500, 1000, 1500, 2000, and/or the like. If the value field in the data vector exceeds the upper threshold, then the match can succeed (814). If the value field does not exceed the upper threshold, then a determination can be made whether the value field exceeds a lower threshold (810). Values such as 50, 75, 100, 125, 150, and/or the like. If the value does not exceed the lower threshold, then the match may fail (816). If the value exceeds the lower threshold, and the value is not evenly divisible by 10 (812), then the match may succeed (814). The operations of flowchart 800 serve as a second way to verify that a match is correct. Not only do the numerical value fields need to match as determined in flowchart 700, but the numerical value fields may need to be within expected ranges, and the text fields may need to be reasonably similar.

Figure 9:
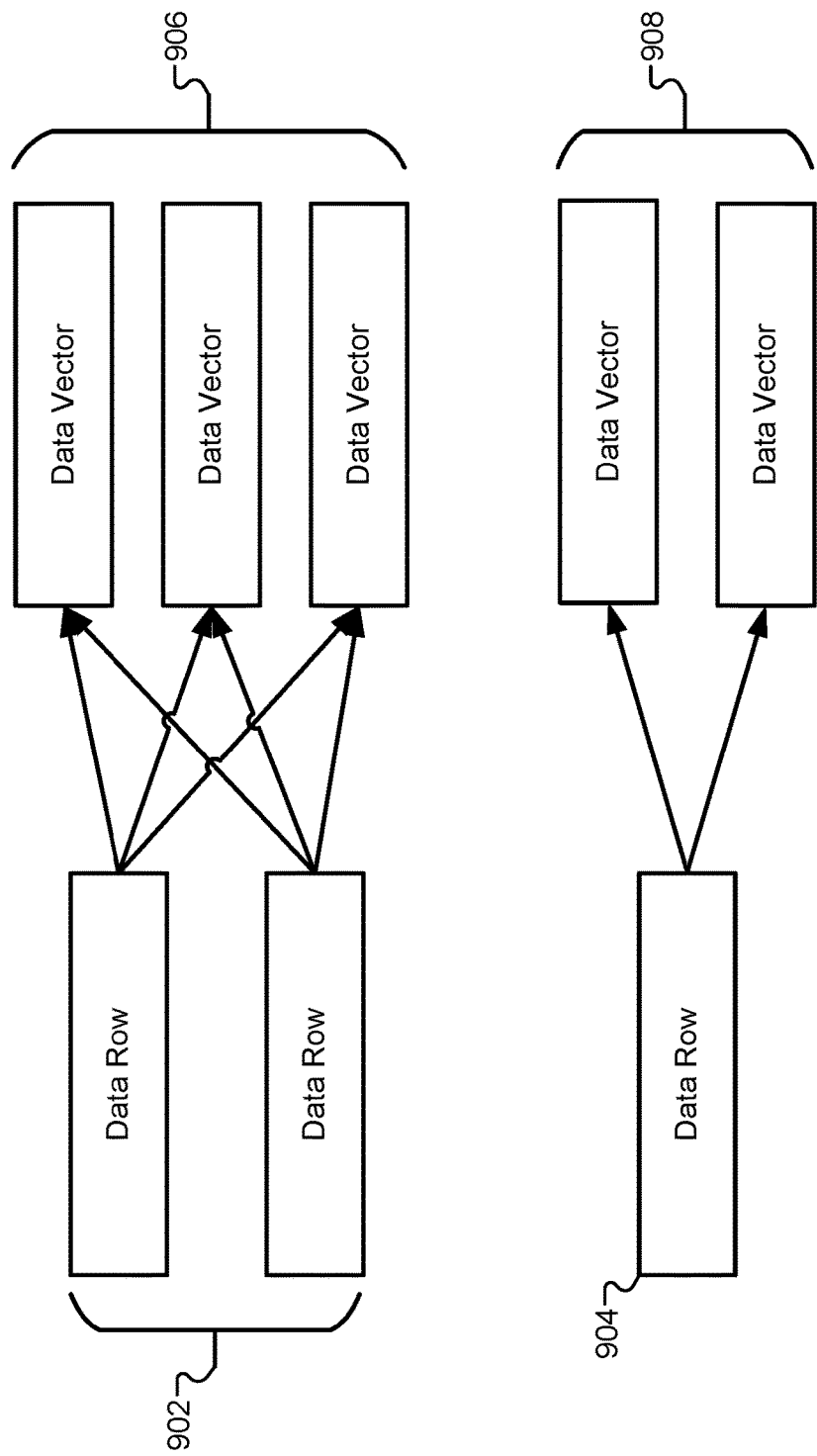
FIG. 9 illustrates a diagram of one way of classifying Type II data vectors, according to some embodiments.

FIG. 9 illustrates a diagram of one way of classifying Type II data vectors, according to some embodiments. As with Type I data vectors, Type II data vectors may be classified according to the type field received from the monitoring computer system. Additionally or alternatively, Type II data vectors may be classified as such based on the type of relationship between the data rows and the data vectors. For example, Type II data vectors may have a one-to-many relationship between data rows 904 and data vectors 908. In some embodiments, Type II data vectors may have multiple one-to-many relationships between data rows 902 and data vectors 906.

Figure 10:
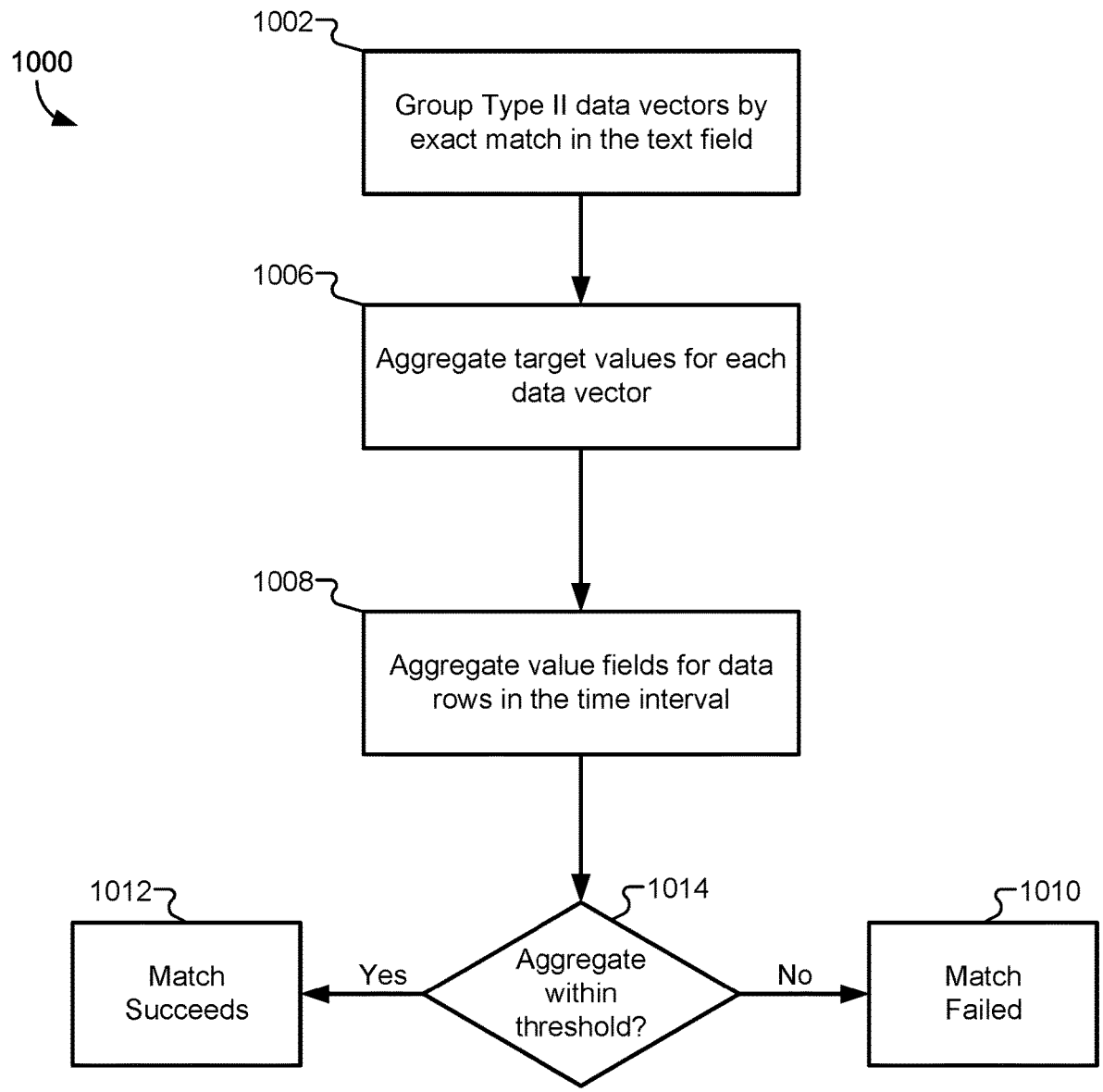
FIG. 10 illustrates a flowchart of a method for detecting matches between Type II data vectors and data rows, according to some embodiments.

FIG. 10 illustrates a flowchart 1000 of a method for detecting matches between Type II data vectors and data rows, according to some embodiments. This flowchart may receive the groupings that were formed in flowchart 600 as described above. The method may include grouping Type II data vectors by exact match in the text field (1002). Because a single data row can be matched with multiple data vectors, the data vectors can be presumed to have the same text field describing the data. The method may also include aggregating target values for each data vector (1006). The "target values" may correspond to the numerical field in each data vector characterizing an expected value transmitted from the aggregator computer system each time interval. The method may next include aggregating value fields for data rows that are matched to the data vector during the time interval (1006).

The method may then determine whether either of the aggregated amounts calculated above in step 1006 and/or step 1008 fall within a threshold amount of each other. As described above, the threshold may be relatively small, as these amounts may be expected to be a close match. Threshold values of 1, 2, 3, 5, 7, 10, and so forth, may be used. If the aggregate totals are within a threshold amount of each other (1014), then the match may be considered to succeed (1012). However, if the aggregate totals are not within a threshold amount of each other, then the match may fail (1010). In some embodiments, the match is detected in step 1012 may be further processed and verified using flowchart 800 in FIG. 8.

Figure 11:
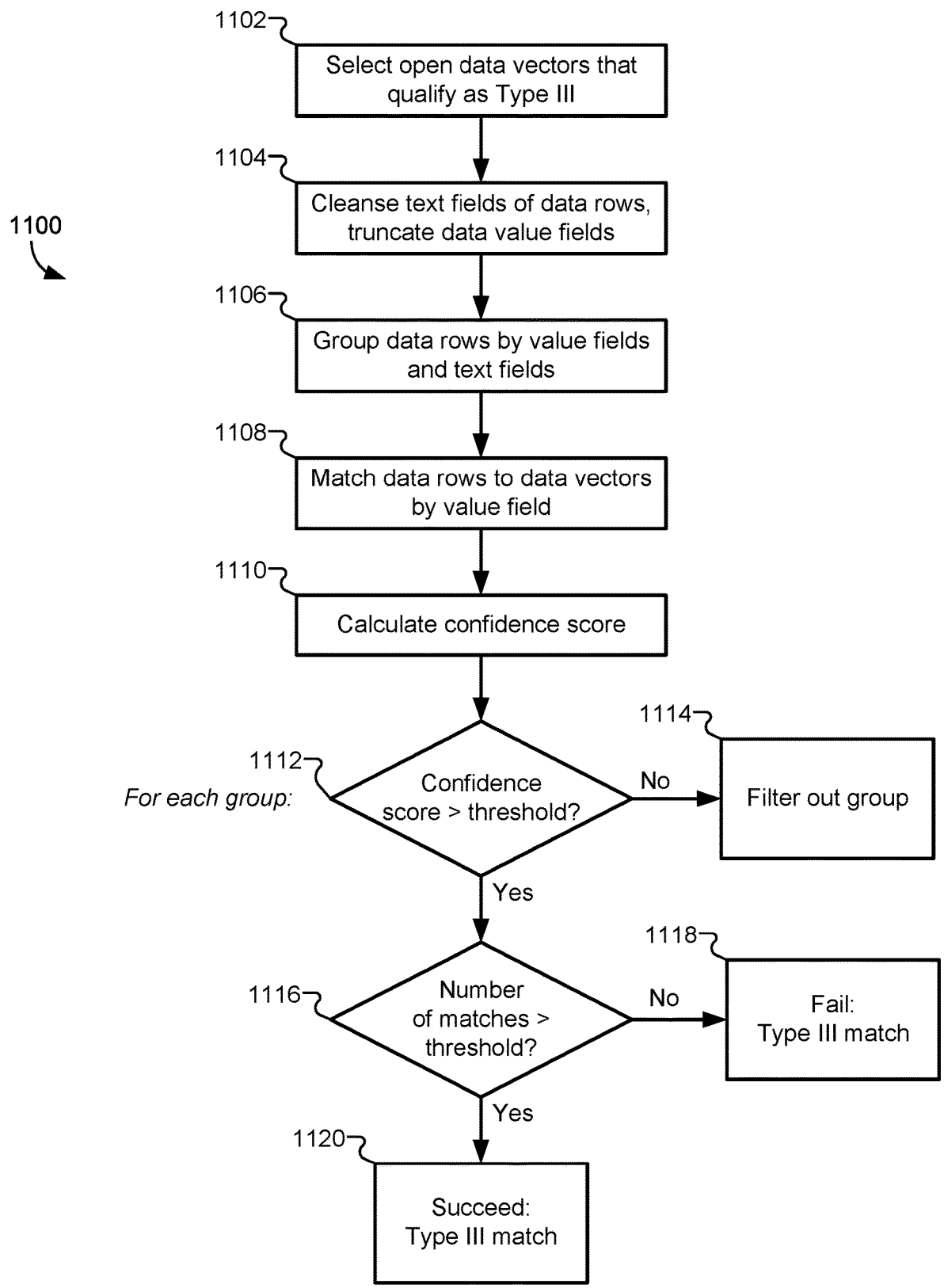
FIG. 11 illustrates a flowchart of a method for detecting matches for Type III data vectors, according to some embodiments.

FIG. 11 illustrates a flowchart 1100 of a method for detecting matches for Type III data vectors, according to some embodiments. In some embodiments, Type III data vectors may be classified as data vectors that did not qualify as Type I or Type II data vectors. In some embodiments, all data vectors may be reconsidered at this stage, allowing for overlap between Type I/II and Type III. Because Type III data vectors may not be as stable or as persistent as Type I or Type II data vectors, the matching process for Type III data vectors may impose additional requirements on the matching process.

The method may include selecting open data vectors that qualify as Type III data vectors (1102). These data vectors may be the remaining data vectors in the set that were not previously classified as Type I or Type II. In some embodiments, the method may distinguish between open and closed data vectors. Open data vectors may be defined as data vectors representing receiving systems that are still actively being monitored by the monitoring computer system. Data vectors that are no longer representing open monitoring streams may be excluded from the matching process.

The method may also include cleansing text fields of data rows and truncating data value fields (1104). In some embodiments, the numerical data value field can be truncated to remove anything to the right side of the decimal point. The text field of each data row can be cleansed as described above, by removing extra whitespace, inserting spaces between alpha characters and numeric characters, removing blacklisted regular expressions, and so forth.

The method may additionally include grouping data rows by value fields and text fields (1106), and the process may take place substantially as described above. The method may then match data rows to data vectors based on the numeric value field in each (1108). A match may be determined based on a data row value falling within a threshold distance of a data vector value.

For each group, a confidence score can be calculated (1110). The calculation of the confidence score will be described in greater detail below. If the confidence score is not above a threshold (1112), then the group can be filtered out as a candidate match (1114). After confidence scores have been calculated and compared to the threshold for each group, a determination can be made as to the number of matches between data rows and Type III data vectors. If the number of matches exceeds a threshold (1116), then a Type III match can be successful. However, if the number of matches does not exceed the threshold, then the Type III match may fail (1118). For example, some embodiments may require at least two matches between Type III data vectors and one or more data rows. Other embodiments may require more or less than two matches. This may be contrasted with the Type I and Type II algorithms, each of which only require a single match in some embodiments.

FIG. 12 illustrates a flowchart of a process for calculating a confidence score for Type III matches, according to some embodiments. The method may include initializing a confidence score for each match using the fuzzy match algorithm score (1202). Match scores of between 25% and 100% may generate a starting score of 5 points, while match scores between 1% and 25% may generate a starting score of 1 point. In some embodiments, a 0% match score can initialize the confidence score to −1 points. In some embodiments, the method may further include determining whether the description in the text field of the data row includes a blacklist expression. If a blacklist expression is included, the confidence score can be reset to 0.

The method may further include adjusting the confidence score based on value field thresholds (1206). It is likely that the aggregator computer system computer system will provide a large number of outputs with relatively small value fields. Therefore, small value fields are more likely to cause collisions with other small value fields, which may have a higher likelihood of inadvertently colliding with a corresponding value field in a data vector from the monitoring computer system. Therefore, small values may reduce the confidence score of the match, while larger values may increase the confidence score of the match. FIG. 12 illustrates ranges of values corresponding to different point adjustments that may be added to the confidence score.

For example, values of between 0-20 may add a large negative score, practically ensuring that the match is not successful. Conversely, numeric value fields above approximately 200 would increase the confidence score by +5 points. In some embodiments, the score may then be multiplied by the number of times the data row with similar values occurred within the time interval.

The method may additionally include adjusting the confidence score based on predetermined exact field amounts (1208). Common values, such as multiples of 5, multiples of 10, or multiples of 100 may also be more likely to inadvertently collide with data vector values that do not actually correspond to output data rows from the aggregator computer system. Therefore, common values, such as multiples of 100, may receive a large negative adjustment to the confidence score. Multiples of other common values may receive somewhat smaller negative adjustments to the confidence score as illustrated in FIG. 12.

Figure 13:
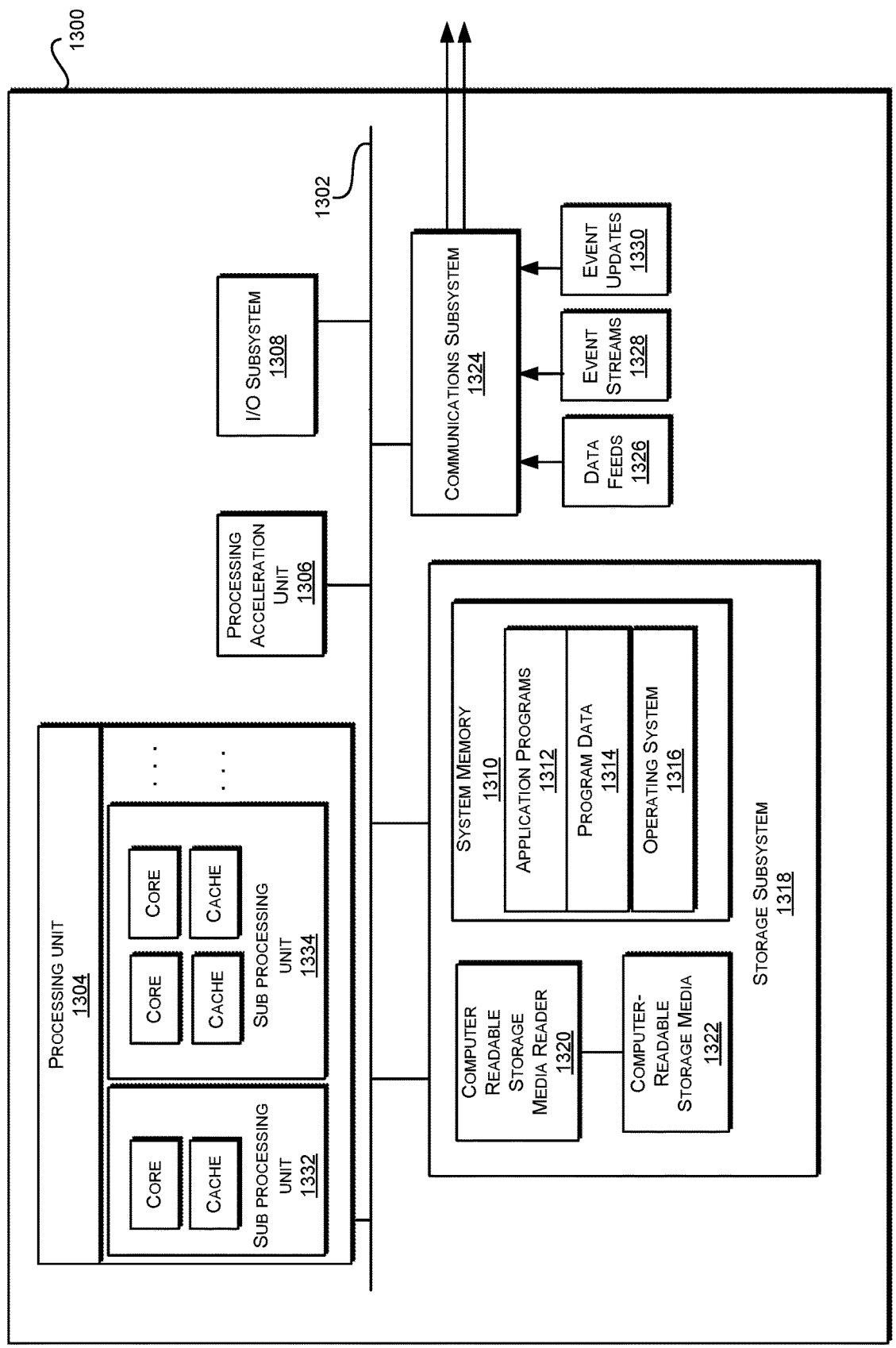
FIG. 13 illustrates an exemplary computer system, in which various embodiments may be implemented.

FIG. 13 illustrates a computer system 1300 in which some embodiments may be implemented. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present invention.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 124 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system comprising:
   one or more processors; and
   one or more memory devices comprising instructions that, when executed by the one or more processors, cause the one or more processors to perform operations comprising:
   receiving a request from a client device to authenticate a user identity linked to a user account;
   accessing one or more external data stores to receive a plurality of data rows from the one or more external data stores, wherein:
   the one or more external data stores receive the plurality of data rows from one or more aggregator computer systems;
   the plurality of data rows are extracted from the user account at the one or more aggregator computer systems; and
   accessing one or more monitoring systems to receive a plurality of data vectors from the one or more monitoring systems, wherein:
   the one or more monitoring systems are configured to monitor transmissions received by one or more receiving systems;

the transmissions are sent from the one or more aggregator computer systems to the one or more receiving systems; and the plurality of data vectors comprise numerical target values for the one or more receiving systems, wherein the numerical target values represent expected values to be received in regular intervals by the one or more receiving systems for the user;

determining whether one or more of the plurality of data rows can be matched to one or more of the plurality of data vectors; and authenticating the user identity linked to the user account based on a determination that the one or more of the plurality of data rows can be matched to the one or more of the plurality of data vectors.

2. The system of claim 1, wherein the operations further comprise adding or removing a task from a task list based on determining that the one or more of the plurality of data rows can be matched to the one or more of the plurality of data vectors.

3. The system of claim 1, wherein the operations further comprise providing, a portal for the client device to log in directly to the one or more aggregator computer systems to release the plurality of data rows using user credentials that are not accessible to the system, wherein the client device authorizes the system to download the plurality of data rows from the one or more aggregator computer systems through the one or more external data stores.

4. The system of claim 1, wherein the operations further comprise filtering data rows from the plurality of data rows where a value field does not exceed a threshold amount before determining whether the one or more of the plurality of data rows can be matched to the one or more of the plurality of data vectors.

5. The system of claim 1, wherein the operations further comprise:
removing non-alphanumeric tokens from a text field of the plurality of data rows; and
removing a blacklist set of known tokens from the text field of the plurality of data rows.

6. The system of claim 1, wherein determining whether the one or more of the plurality of data rows can be matched to the one or more of the plurality of data vectors comprises matching data rows using a fuzzy match algorithm with a result above a threshold amount.

7. The system of claim 1, wherein the operations further comprise calculating a confidence score for the one or more of the plurality of data rows that can be matched to the one or more of the plurality of data vectors.

8. A method for authenticating user identities that are linked to user accounts, the method comprising:
receiving a request from a client device to authenticate a user identity linked to a user account;
accessing one or more external data stores to receive a plurality of data rows from the one or more external data stores, wherein:
the one or more external data stores receive the plurality of data rows from one or more aggregator computer systems;
the plurality of data rows are extracted from the user account at the one or more aggregator computer systems; and
accessing one or more monitoring systems to receive a plurality of data vectors from the one or more monitoring systems, wherein:

the one or more monitoring systems are configured to monitor transmissions received by one or more receiving systems;

the transmissions are sent from the one or more aggregator computer systems to the one or more receiving systems; and the plurality of data vectors comprise numerical target values for the one or more receiving systems, wherein the numerical target values represent expected values to be received in regular intervals by the one or more receiving systems for the user;

determining whether one or more of the plurality of data rows can be matched to one or more of the plurality of data vectors; and authenticating the user identity linked to the user account based on a determination that the one or more of the plurality of data rows can be matched to the one or more of the plurality of data vectors.

9. The method of claim 8, further comprising determining a type for each of the plurality of data vectors, wherein the type determines a matching algorithm used to determine matches between the plurality of data rows and the plurality of data vectors.

10. The method of claim 8, further comprising converting the plurality of data rows into a unified format readable by diverse internal systems.

11. The method of claim 8, further comprising converting the plurality of data vectors into a unified format readable by diverse internal systems.

12. The method of claim 8, further comprising determining whether the one or more of the plurality of data rows can be matched to the one or more of the plurality of data vectors by determining whether a potential match is a one-to-many match, a one-to-one match, or a many-to-one match between the plurality of data vectors and the plurality of data rows.

13. The method of claim 8, further comprising requiring at least one additional authentication measure based on determining that the one or more of the plurality of data rows can be matched to the one or more of the plurality of data vectors.

14. The method of claim 8, further comprising adding or removing a task from a task list based on the determination that the one or more of the plurality of data rows can be matched to the one or more of the plurality of data vectors.

15. A non-transitory computer-readable medium comprising instructions that, when executed by one or more processors, cause the one or more processors to perform operations comprising:
receiving a request from a client device to authenticate a user identity linked to a user account;
accessing one or more external data stores to receive a plurality of data rows from the one or more external data stores, wherein:
the one or more external data stores receive the plurality of data rows from one or more aggregator computer systems;
the plurality of data rows are extracted from the user account at the one or more aggregator computer systems; and
accessing one or more monitoring systems to receive a plurality of data vectors from the one or more monitoring systems, wherein:
the one or more monitoring systems are configured to monitor transmissions received by one or more receiving systems;

the transmissions are sent from the one or more aggregator computer systems to the one or more receiving systems; and the plurality of data vectors comprise numerical target values for the one or more receiving systems, wherein the numerical target values represent expected values to be received in regular intervals by the one or more receiving systems for the user;

determining whether one or more of the plurality of data rows can be matched to one or more of the plurality of data vectors; and authenticating the user identity linked to the user account based on a determination that the one or more of the plurality of data rows can be matched to the one or more of the plurality of data vectors.

16. The non-transitory computer-readable medium of claim 15, wherein the operations further comprise providing, a portal for the client device to log in directly to the one or more aggregator computer systems to release the plurality of data rows using user credentials that are not accessible to the system, wherein the client device authorizes the system to download the plurality of data rows from the one or more aggregator computer systems through the one or more external data stores.

17. The non-transitory computer-readable medium of claim 15, wherein the operations further comprise filtering data rows from the plurality of data rows where a value field does not exceed a threshold amount before determining whether the one or more of the plurality of data rows can be matched to the one or more of the plurality of data vectors.

18. The non-transitory computer-readable medium of claim 15, wherein the operations further comprise determining a type for each of the plurality of data vectors, wherein the type determines a matching algorithm used to determine matches between the plurality of data rows and the plurality of data vectors.

19. The non-transitory computer-readable medium of claim 15, wherein the operations further comprise determining whether the one or more of the plurality of data rows can be matched to the one or more of the plurality of data vectors by determining whether a potential match is a one-to-many match, a one-to-one match, or a many-to-one match between the plurality of data vectors and the plurality of data rows.

20. The non-transitory computer-readable medium of claim 15, wherein the plurality of data rows from the one or more external data stores comprise records of values sent from the one or more aggregator systems to the one or more receiving systems, and the one or more plurality of data vectors are part of a credit report from the one or more monitoring systems.

* * * * *